United States Patent
Ramachandra et al.

(10) Patent No.: US 11,860,925 B2
(45) Date of Patent: Jan. 2, 2024

(54) HUMAN CENTERED COMPUTING BASED DIGITAL PERSONA GENERATION

(71) Applicant: ACCENTURE GLOBAL SOLUTIONS LIMITED, Dublin (IE)

(72) Inventors: Nisha Ramachandra, Bangalore (IN); Manish Ahuja, Bangalore (IN); Raghotham M Rao, Bangalore (IN); Neville Dubash, Mumbai (IN); Sanjay Podder, Thane (IN); Rekha M. Menon, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 298 days.

(21) Appl. No.: 17/222,567

(22) Filed: Apr. 5, 2021

(65) Prior Publication Data
US 2021/0326372 A1     Oct. 21, 2021

(30) Foreign Application Priority Data
Apr. 17, 2020 (IN) .............................. 202011016634

(51) Int. Cl.
*G06F 16/00* (2019.01)
*G06F 16/435* (2019.01)
(Continued)

(52) U.S. Cl.
CPC .......... *G06F 16/437* (2019.01); *G06N 3/006* (2013.01); *H04N 21/8545* (2013.01); *G06F 40/35* (2020.01); *G06V 40/174* (2022.01)

(58) Field of Classification Search
CPC ........ G06F 16/00; G06F 16/437; G06F 40/35; G06V 40/16; H04N 21/8545; G11B 27/34;
(Continued)

(56) References Cited

U.S. PATENT DOCUMENTS

2004/0107106 A1* 6/2004 Margaliot ............... G10L 21/10
704/E21.02
2017/0185920 A1* 6/2017 Chawla .................... G06N 5/04
(Continued)

FOREIGN PATENT DOCUMENTS

WO         2016011159 A9     9/2016

OTHER PUBLICATIONS

Nisha Ramachandra et al, "Human Centered Computing in Digital Persona Generation", (11 pages).
(Continued)

Primary Examiner — Yicun Wu
(74) Attorney, Agent, or Firm — Mannava & Kang, P.C.

(57) ABSTRACT

In some examples, human centered computing based digital persona generation may include generating, for a digital persona that is to be generated for a target person, synthetic video files and synthetic audio files that are combined to generate synthetic media files. The digital persona may be generated based on a synthetic media file. An inquiry may be received from a user of the generated digital persona. Another synthetic media file may be used by the digital persona to respond to the inquiry. A real-time emotion of the user may be analyzed based on a text sentiment associated with the inquiry, and a voice sentiment and a facial expression associated with the user. Based on the real-time emotion of the user, a further synthetic media file may be utilized by the digital persona to continue or modify a conversation between the generated digital persona and the user.

17 Claims, 14 Drawing Sheets

(51) Int. Cl.
*H04N 21/8545* (2011.01)
*G06N 3/006* (2023.01)
*G06F 40/35* (2020.01)
*G06V 40/16* (2022.01)

(58) Field of Classification Search
CPC ........ G06N 3/006; G06N 3/004; G06N 20/00; G06N 5/02; G06N 5/022
See application file for complete search history.

(56) References Cited

U.S. PATENT DOCUMENTS

2019/0325632 A1  10/2019  Rinker
2020/0257954 A1* 8/2020  Klein .................. G06N 5/04

OTHER PUBLICATIONS

Gerrit C. van der Veer, "Cognitive ergonomics and user interface design", Journal of Universal Computer Science, vol. 14, No. 16 (2008), pp. 2614-2629.
Microsoft Azure, "An ai service that analyses faces in images" (2020), retrieved from the Internet on Apr. 12, 2021, 16 pages. <https://azure.microsoft.com/en-in/services/cognitive-services/face/>.
Deepfakes Web, "Create your own deepfakes online", retrieved from the Internet on Apr. 12, 2021, 4 pages. <https://deepfakesweb.com/>.
Microsoft Azure, "Language understanding (luis)", retrieved from the Internet on Apr. 12, 2021, 1 page. <https://www.luis.ai/home>.
Github, "Real-time multimodal emotion recognition", Sep. 7, 2020, 13 pages.
"The salvador dali museum", retrieved from the Internet on Apr. 12, 2021, 4 pages. <https://thedali.org/>.
Microsoft Azure, "Text analytics api documentation", retrieved from the Internet on Apr. 12, 2021, 4 pages. <https://docs.microsoft.com/en-us/azure/cognitive-services/text-analytics/>.
Arik et al. "Neural voice cloning with a few samples", CoRR abs/1802.06006 ( Oct. 12, 2018), 18 pages.
Kan bayashi, "Unofficial parallel wavegan (+ melgan) implementation with pytorch" (2020), 14 pages.
National Science Foundation, "Cise—iis—about". (2020), retrieved from the Internet on Apr. 12, 2021, 2 pages. <http://www.nsf.gov/cise/iis/about.jsp>.
Cortes et al., "Support-vector networks". Machine learning 20(3), pp. 273-297, (1995).
Github, "Deepfacelab is the leading software for creating deepfakes". (2020), 12 pages.
Github, "Pytorch implementation of convolutional neural networks-based text-to-speech synthesis models" (2019), 11 pages.
Egger et al., "Emotion recognition from physiological signal analysis: A review", Electronic Notes in Theoretical Computer Science 343, pp. 35-55, (2019).
Github, "Faceswap: Deepfakes software for all". (2020), 11 pages.
Github, "A denoising autoencoder + adversarial losses and attention mechanisms for face swapping", (2019), 11 pages.
Fried et al., "Text-based editing of talking-head video", ACM Trans. Graph. 38(4) (Jul. 2019), 14 pages.
George Seif, "You can now speak using someone else's voice with deep learning", Jul. 2, 2019, 6 pages.
Wikipedia, "Holography", retrieved from the Internet on Apr. 14, 2021, 27 pages. <https://en.wikipedia.org/wiki/Holography>.
Jaimes, A., Sebe, N., Gatica-Perez, D.: Human-centered computing: A multimedia perspective. In: Proceedings of the 14th ACM International Conference on Multimedia. p. 855-864. MM '06, Association for Computing Machinery, New York, NY, USA (2006).
Jesus Rodriguez, "These Five Platforms Will Make Your Bots Language-Intelligent", Aug. 11, 2016, 5 pages.
Ye Jia et al., "Transfer Learning from Speaker Verification to Multispeaker Text-To-Speech Synthesis", 32nd Conference on Neural Information Processing Systems (NeurIPS 2018), Montreal, Canada, 15 pages.
Salome Kazeminia et al., "GANs for medical image analysis", Artificial Intelligence in Medicine, vol. 109, Sep. 2020, 40 pages.
Github-rcmalli/keras-vggface"Vggface implementation with keras framework", retrieved from the Internet on Apr. 14, 2021, 5 pages. <https://github.com/rcmalli/keras-vggface>.
Jan Kietzmann et al., "Deepfakes: Trick or treat?", Business Horizons, vol. 63, Issue 2, Mar.-Apr. 2020, pp. 135-146.
Kazuhiro Kobayashi et al., "sprocket: Open-Source Voice Conversion Software", Proc. Odyssey 2018 The Speaker and Language Recognition Workshop, 203-210, DOI: 10.21437/Odyssey.2018-29.
Jesse Scardina, "emotions analytics (EA)", retrieved from the Internet on Apr. 14, 2021, 6 pages. <https://searchcustomerexperience.techtarget.com/definition/emotions-analytics-EA>.
Nguyen et al., "Deep learning for deepfakes creation and detection" (Sep. 2019).
Nina Gordon, "10X Your Employee Engagement with Immersive Learning Experiences", Jul. 2, 2019, 8 pages.
Van den Oord et al., "Wavenet: A Generative Model for Raw Audio", Sep. 19, 2016, 15 pages.
Ping et al., Deep voice 3: Scaling text-to-speech with convolutional sequence learning (2017).
Soren Pold, Postmodern Culture, "Interface Realisms: The Interface as Aesthetic Form", vol. 15, No. 2, Jan. 2005, 3 pages.
Sander et al., "The Humachine: Humankind, Machines, and the Future of Enterprise with John Wood", Apr. 22, 2020. Youtube video, <https://www.youtube.com/watch?v=iXIoXnqpPH0>.
Shen et al., "Natural TTS Synthesis by Conditioning Wavenet on MEL Spectrogram Predictions", 2018 IEEE International Conference on Acoustics, Speech and Signal Processing (ICASSP).
Enrique Tomas, "How the Arts Can Help Tangible Interaction Design: A Critical Re-Orientation", Published: Sep. 15, 2017, 15 pages.
Wang et al., "Tacotron: A Fully End-to-End Text-to-Speech Synthesis Model", Mar. 2017, 11 pages.
L. Weiying, "The 3D holographic projection technology based on three-dimensional computer graphics," 2012 International Conference on Audio, Language and Image Processing, Shanghai, China, 2012, pp. 403-406, doi: 10.1109/ICALIP.2012.6376651.

* cited by examiner

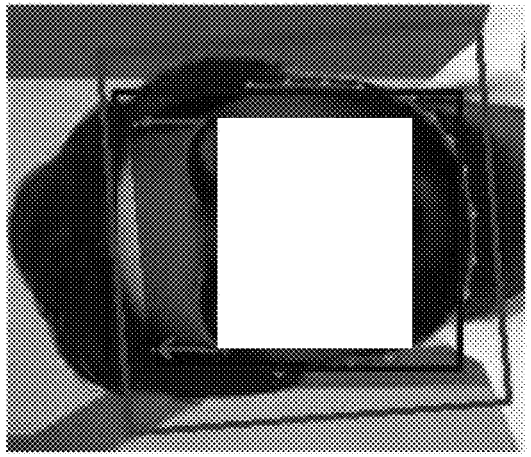
Convex Hull after moving the leftmost and rightmost eyebrow points upward.
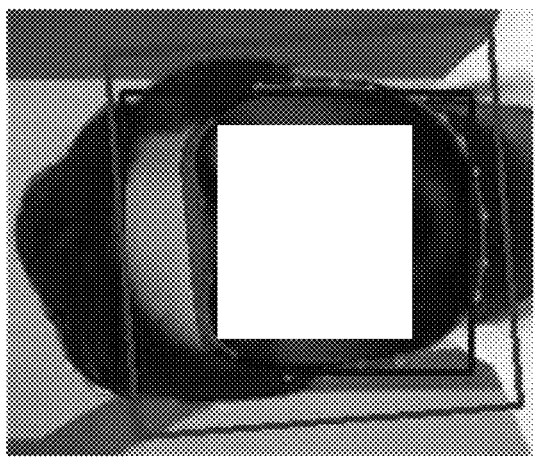
Convex Hull of points returned
FIG. 8

1200

```
GENERATE, FOR A DIGITAL PERSONA THAT IS TO BE GENERATED FOR A TARGET
PERSON, A PLURALITY OF SYNTHETIC VIDEO FILES
1202
                              ↓
GENERATE, FOR THE DIGITAL PERSONA THAT IS TO BE GENERATED FOR THE
TARGET PERSON, A PLURALITY OF SYNTHETIC AUDIO FILES
1204
                              ↓
GENERATE A PLURALITY OF SYNTHETIC MEDIA FILES BY COMBINING THE
SYNTHETIC VIDEO FILES AND THE SYNTHETIC AUDIO FILES
1206
                              ↓
GENERATE, BASED ON A SYNTHETIC MEDIA FILE OF THE PLURALITY OF SYNTHETIC
MEDIA FILES, THE DIGITAL PERSONA DISPLAYED AS A HOLOGRAPHIC PROJECTION
OF THE TARGET PERSON
1208
```

*FIG. 12*

HUMAN CENTERED COMPUTING BASED DIGITAL PERSONA GENERATION

PRIORITY

The present application claims priority under 35 U.S.C. 119(a)-(d) to Indian Provisional Patent Application number 202011016634, having a filing date of Apr. 17, 2020, the disclosure of which is hereby incorporated by reference in its entirety.

BACKGROUND

A deepfake, which may also be referred to as a digital persona, may represent synthetic media where an original person in a video or an image is replaced with another person that may represent an intended target (or target person) of the synthetic media. The synthetic media may be used to give an impression that the target person is performing the actions of the original person.

BRIEF DESCRIPTION OF DRAWINGS

Features of the present disclosure are illustrated by way of example and not limited in the following figure(s), in which like numerals indicate like elements, in which:

FIG. 8 illustrates mask extension to illustrate operation of the human centered computing based digital persona generation apparatus of FIG. 1 in accordance with an example of the present disclosure;

FIG. 12 illustrates a flowchart of an example method for human centered computing based digital persona generation in accordance with an example of the present disclosure.

DETAILED DESCRIPTION

Figure 1:
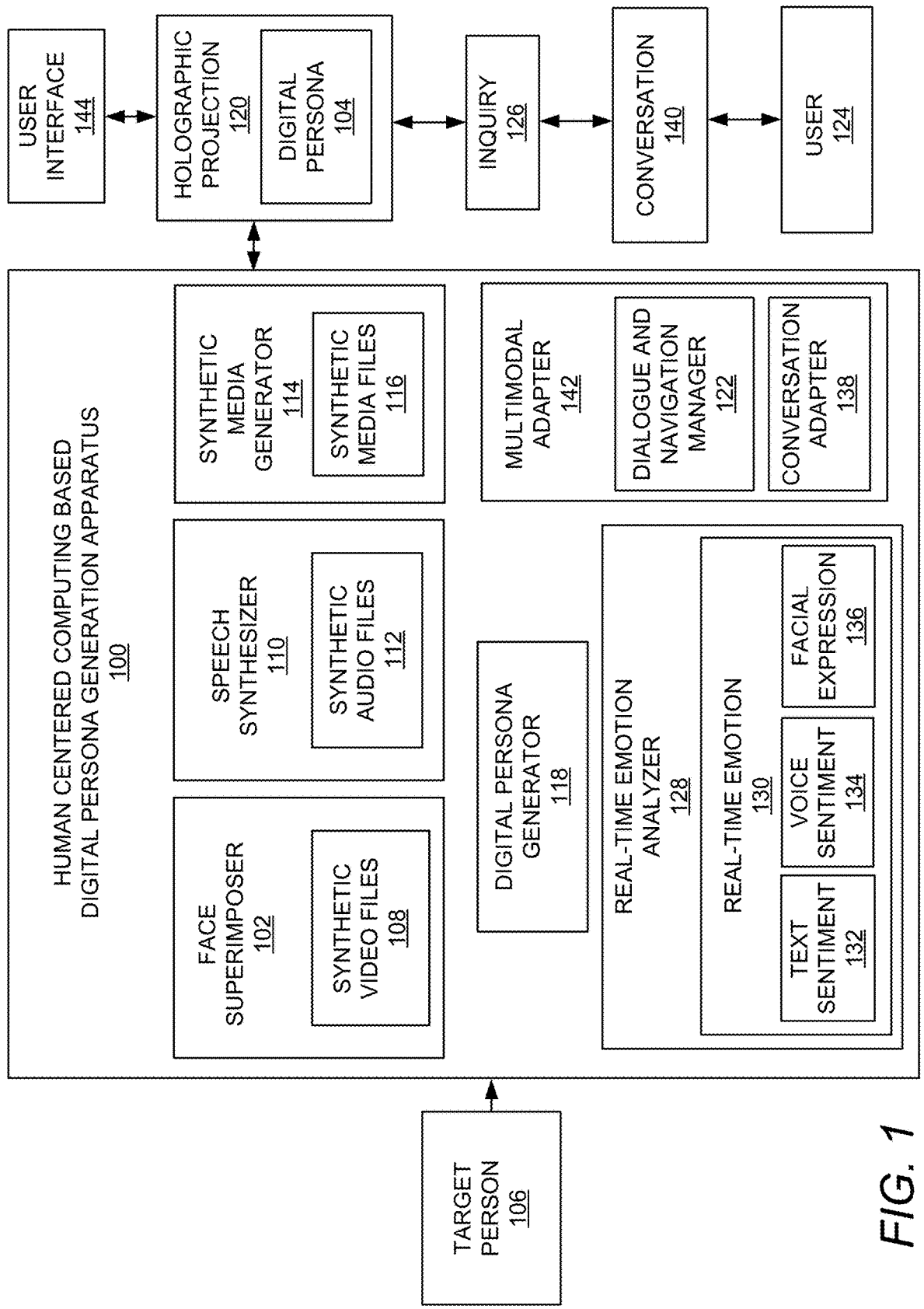
FIG. 1 illustrates a layout of a human centered computing based digital persona generation apparatus in accordance with an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Human centered computing based digital persona generation apparatuses, methods for human centered computing based digital persona generation, and non-transitory computer readable media having stored thereon machine readable instructions to provide human centered computing based digital persona generation are disclosed herein. The apparatuses, methods, and non-transitory computer readable media disclosed herein provide for the generation of a digital persona to engage in a conversation with a user, or a plurality of users, where the digital persona accounts for both details of the conversation, as well as real-time emotions of the user while conducting the conversation.

A digital persona (which may also be referred to as a deepfake), may be used to create synthetic media in which an original person in an existing image or video is replaced with another person (e.g., a target person) who is not present in that media. A digital persona may refer to manipulated videos, or other digital representations produced by sophisticated artificial intelligence, that yield fabricated images and sounds that appear to be real. The digital persona may be implemented to create "fake" personas using deep learning techniques. In this regard, digital personas may leverage techniques that include machine learning and artificial intelligence to manipulate or generate visual and audio content with a high potential to deceive.

In some cases, digital personas may be used for the purpose of defaming someone where the user experience is not much of a concern. Instead, for the apparatuses, methods, and non-transitory computer readable media disclosed herein, digital personas may be implemented for comparatively good purposes. For example, for the apparatuses, methods, and non-transitory computer readable media disclosed herein, digital personas may be used for the creation of visual storytelling in the field of education and films, creation of medical images to train artificial intelligence in the medical field, to originate a conversation to guide an end-user towards positive thinking, and for other such positive purposes. For example, for the apparatuses, methods, and non-transitory computer readable media disclosed herein, an example is disclosed herein where the digital persona of a renowned deceased artist may be created with the aim of enabling and enriching human experience by interacting with a three-dimensional holographic image of an artist (e.g., the deceased artist) in a museum. In this regard, it is technically challenging to account for end-user experience as part of the design requirements for the digital persona. For example, it is technically challenging to implement a digital persona within ethical limits, where the digital persona also accounts for end-user experience.

For the apparatuses, methods, and non-transitory computer readable media disclosed herein, other technical challenges associated with implementation of the digital persona may include analysis of a relatively large amount of data needed to respect to images and voice files of the target person that is to be implemented as a digital persona. The technical challenges may also include identification and utilization of an appropriate person (e.g., an actor) to portray the target person that is to be implemented as a digital persona, as well as generation of a voice associated with the digital persona. Yet further, technical challenges associated with implementation of the digital persona may also include understanding of a natural language of the user, or a plurality of users, that are to converse with the digital persona.

For the apparatuses, methods, and non-transitory computer readable media disclosed herein, further technical challenges associated with implementation of the digital persona may include implementation of a realistic digital persona (e.g., digital twin), for example, for a famous person that may be deceased (e.g., the example of the deceased artist as disclosed herein), where the implementation utilizes face superimposition, voice synthesis, and movements associated with the digital persona. Technical challenges associated with implementation of the digital persona may also include generation of a three-dimensional holographic interactive digital persona, and use of auditable software development to certify the digital persona. Yet further, other technical challenges associated with implementation of the digital persona may include achieving seamless conversation interaction between the user, or a plurality of users, and the digital persona, as well as modification of interactions between the user and the digital persona, while accounting for the user's emotions, for example, in dim light conditions.

The apparatuses, methods, and non-transitory computer readable media disclosed herein overcome the aforementioned technical challenges by implementing the digital persona to ensure that a user, or a plurality of users (e.g., an audience) is immersed in a conversation with the digital persona implemented as disclosed herein. In this regard, the apparatuses, methods, and non-transitory computer readable media disclosed herein may enable the user (for a plurality of users that may include learners) to better understand concepts from famous individuals, such as famous artists, and other such personalities. The apparatuses, methods, and non-transitory computer readable media disclosed herein may also enable children and adults alike to share knowledge sessions, and to be motivated to learn from such famous individuals. Further, the apparatuses, methods, and non-transitory computer readable media disclosed herein may implement a human centered computing methodology to implement the digital persona.

For the apparatuses, methods, and non-transitory computer readable media disclosed herein, some elements of the human centered computing may include technology, cognitive psychology and ergonomics, social and organizational psychology, design and arts, interaction, and analysis for design of the digital persona with a human focus from the beginning to the end.

The human centered computing may involve creation of theoretical frameworks, design and implementation of technical approaches and systems in many areas which include, for example, systems for problem-solving by people interacting in distributed environments, multimedia and multimodal interfaces, intelligent interfaces and user modelling, information visualization and adaptation of content to accommodate different capabilities, modalities, bandwidth and latency, etc. In this regard, the apparatuses, methods, and non-transitory computer readable media disclosed herein may implement the human centered computing design approach for the creation of a digital persona adhering to the characteristics of being expressive, responsive, proactive and adaptive. For implementation of this approach, sociology, psychology and cognitive science may be analyzed, along with the technology to present the digital persona for an engaged and immersive experience.

For the apparatuses, methods, and non-transitory computer readable media disclosed herein, implementation of the conversational digital persona with ethical human centered computing and multimodal analysis of data may be performed by sensing users and environment, and creating the digital persona. With respect to sensing users and environment, these aspects may be implemented in the context of cognitive psychology ergonomics, and social and organizational psychology. With respect to cognitive psychology ergonomics that represent operation of mental processes through behavioral inferences, the apparatuses, methods, and non-transitory computer readable media disclosed herein may include the analysis of user perception, analysis of attention span, and evaluation of a development environment. With respect to social and organizational psychology that explores how people's thoughts are influenced by others presence, the apparatuses, methods, and non-transitory computer readable media disclosed herein may include analysis of user perception in groups, and analysis of social behavior and group interactions. With respect to creation of the digital persona, these aspects may be implemented in the context of design and art, and technology. With respect to design and arts, the apparatuses, methods, and non-transitory computer readable media disclosed herein may include persona study, user experience design, storyboarding, and prototype sketches. Further, with respect to technology that includes creation of the digital persona using deep learning, the apparatuses, methods, and non-transitory computer readable media disclosed herein may provide for the generation and utilization of synthetic videos, synthetic audio, conversational artificial intelligence, and emotion detection.

For the apparatuses, methods, and non-transitory computer readable media disclosed herein, synthetic media as disclosed herein may be created by morphing a face. Speech synthesis techniques may also be utilized to generate a synthetic audio (e.g., a "fake" voice). The apparatuses, methods, and non-transitory computer readable media disclosed herein may utilize machine learning to allow users to edit a text transcript of a video that is used to generate synthetic audio to add, delete, or change words that are spoken, for example, by the target person.

For the apparatuses, methods, and non-transitory computer readable media disclosed herein, a requirement of the digital persona may include the ability to interact with a user, or a plurality of users. Requirements of the digital persona may further include the ability to create an effect of users having a conversation with a real person by engaging the user. For example, with respect to the example of the deceased artist as disclosed herein, a user may be engaged in a conversation related to art from an origin of the artist, as well as art generally.

The apparatuses, methods, and non-transitory computer readable media disclosed herein may implement face superimposition and speech synthesis based on deep learning, natural language understanding for conversation, and emotion detection to measure an end-user involvement during an interaction. In this regard, in order to create an ideal digital persona which is to be perceived as very realistic, the apparatuses, methods, and non-transitory computer readable media disclosed herein may generate a digital persona that is immersive, expressive, responsive, proactive, and adaptive.

For the apparatuses, methods, and non-transitory computer readable media disclosed herein, the digital persona may be immersive in that there are no visual flaws in creation of the digital persona for the end user to identify the digital persona as being fake (e.g., not the target person). In this regard, the digital experience of the digital persona being projected on a screen may provide for an end user to remain engaged and focused.

For the apparatuses, methods, and non-transitory computer readable media disclosed herein, the digital persona may be expressive in that the digital persona may be implemented to effectively and eloquently converse with the end user with appropriate expressions.

For the apparatuses, methods, and non-transitory computer readable media disclosed herein, the digital persona may be responsive in that the digital persona may be implemented to correctly respond to questions asked by the end user, and reply politely (e.g., diplomatically) to any unfamiliar questions.

For the apparatuses, methods, and non-transitory computer readable media disclosed herein, the digital persona may be proactive in that if during an interaction, the end-user deviates from a conversation related to an expertise of the digital persona (e.g., artworks), the digital persona may be implemented to proactively guide the end-user to a topic related to the digital persona (e.g., art related topics).

For the apparatuses, methods, and non-transitory computer readable media disclosed herein, the digital persona may be adaptive in that based on an involvement level and end-user expression, the digital persona may be implemented to understand a user's mood, and be flexible (e.g., adaptive to change) during a conversation.

In order to ensure adherence to the aforementioned characteristics of a digital persona, the apparatuses, methods, and non-transitory computer readable media disclosed herein may implement the aforementioned human centered computing design principles along with ethical guidelines as disclosed herein.

In order to implement a digital persona in a socially positive (e.g., good) scenario, the apparatuses, methods, and non-transitory computer readable media disclosed herein may consider the aspects of the deployment environment, as well as user interactions during deployment. In this regard, the apparatuses, methods, and non-transitory computer readable media disclosed herein may implement human centered computing as disclosed herein to create a realistic digital persona using, for example, deepfake technology, along with adherence to compliance and ethics. In this regard, the apparatuses, methods, and non-transitory computer readable media disclosed herein may create the digital persona by accounting for engagement and satisfaction, support of a multimodal approach by taking into account human feedback for an enhanced experience, respect of individual user behavior during an interaction, reflection of an aim of creating a digital persona, and ethical compliance to reflect trustworthiness and avoiding misuse.

For the apparatuses, methods, and non-transitory computer readable media disclosed herein, the elements of the apparatuses, methods, and non-transitory computer readable media disclosed herein may be any combination of hardware and programming to implement the functionalities of the respective elements. In some examples described herein, the combinations of hardware and programming may be implemented in a number of different ways. For example, the programming for the elements may be processor executable instructions stored on a non-transitory machine-readable storage medium and the hardware for the elements may include a processing resource to execute those instructions. In these examples, a computing device implementing such elements may include the machine-readable storage medium storing the instructions and the processing resource to execute the instructions, or the machine-readable storage medium may be separately stored and accessible by the computing device and the processing resource. In some examples, some elements may be implemented in circuitry.

FIG. 1 illustrates a layout of an example human centered computing based digital persona generation apparatus (hereinafter also referred to as "apparatus 100").

Referring to FIG. 1, the apparatus 100 may include a face superimposer 102 that is executed by at least one hardware processor (e.g., the hardware processor 1102 of FIG. 11, and/or the hardware processor 1304 of FIG. 13) to generate, for a digital persona 104 that is to be generated for a target person 106, a plurality of synthetic video files 108.

A speech synthesizer 110 that is executed by the at least one hardware processor (e.g., the hardware processor 1102 of FIG. 11, and/or the hardware processor 1304 of FIG. 13) may generate, for the digital persona 104 that is to be generated for the target person 106, a plurality of synthetic audio files 112.

A synthetic media generator 114 that is executed by the at least one hardware processor (e.g., the hardware processor 1102 of FIG. 11, and/or the hardware processor 1304 of FIG. 13) may generate a plurality of synthetic media files 116 by combining the synthetic video files 108 and the synthetic audio files 112.

A digital persona generator 118 that is executed by the at least one hardware processor (e.g., the hardware processor 1102 of FIG. 11, and/or the hardware processor 1304 of FIG. 13) may generate, based on a synthetic media file of the plurality of synthetic media files 116, the digital persona 104 displayed as a holographic projection 120 of the target person 106.

A dialogue and navigation manager 122 that is executed by the at least one hardware processor (e.g., the hardware processor 1102 of FIG. 11, and/or the hardware processor 1304 of FIG. 13) may receive, from a user 124 of the generated digital persona 104, an inquiry 126. The dialogue and navigation manager 122 may utilize, based on an analysis of the inquiry 126 and by the generated digital persona 104, another synthetic media file of the plurality of synthetic media files 116 to respond to the inquiry 126.

A real-time emotion analyzer 128 that is executed by the at least one hardware processor (e.g., the hardware processor 1102 of FIG. 11, and/or the hardware processor 1304 of FIG. 13) may analyze a real-time emotion 130 of the user 124 by analyzing a text sentiment 132 associated with the inquiry 126, a voice sentiment 134 associated with the user 124, and a facial expression 136 associated with the user 124.

A conversation adapter 138 that is executed by the at least one hardware processor (e.g., the hardware processor 1102 of FIG. 11, and/or the hardware processor 1304 of FIG. 13) may utilize, based on the real-time emotion 130 of the user 124 and by the generated digital persona 104, a further synthetic media file of the plurality of synthetic media files 116 to continue or modify a conversation 140 between the generated digital persona 104 and the user 124.

According to examples disclosed herein, the conversation adapter 138 may utilize, based on a level selected from a plurality of levels (e.g., low, medium, high) associated with the real-time emotion 130 of the user 124 and by the generated digital persona 104, a further synthetic media file of the plurality of synthetic media files 116 to continue or modify a conversation 140 between the generated digital persona 104 and the user 124.

According to examples disclosed herein, the conversation adapter 138 may utilize, based on the real-time emotion 130 of the user 124, a topic of interest specified by the user 124, and by the generated digital persona 104, a further synthetic media file of the plurality of synthetic media files 116 to continue or modify a conversation 140 between the generated digital persona 104 and the user 124.

According to examples disclosed herein, the conversation adapter 138 may compare an involvement level of the user 124 to a specified threshold (e.g., 50%). In this regard, based on a determination that the involvement level meets or exceeds the specified threshold, the conversation adapter 138 may continue a conversation 140 between the generated digital persona 104 and the user 124. Further, based on a determination that the involvement level is less than the specified threshold, the conversation adapter 138 may modify the conversation 140 between the generated digital persona 104 and the user 124.

According to examples disclosed herein, the dialogue and navigation manager may receive, from the user 124 of the generated digital persona 104, the inquiry 126 by receiving, within a specified time interval (e.g., 30 seconds) associated with monitoring for inquiries, the inquiry 126 from the user 124.

According to examples disclosed herein, the dialogue and navigation manager 122 may determine whether a specified time interval (e.g., 30 seconds) associated with monitoring for inquiries is exceeded. Based on a determination that the specified time interval associated with monitoring for inquiries is exceeded, the dialogue and navigation manager 122 may utilize, by the generated digital persona 104, a further synthetic media file of the plurality of synthetic media files 116 to prompt the user 124.

According to examples disclosed herein, the dialogue and navigation manager 122 may end, based on a keyword (e.g., stop, bye, etc.) in the inquiry 124, a conversation 140 between the generated digital persona 104 and the user 124.

According to examples disclosed herein, the dialogue and navigation manager 122 may determine, based on training associated with a plurality of user utterances, which synthetic media file of the plurality of synthetic media files 116 to utilize to respond to the inquiry 126.

According to examples disclosed herein, the speech synthesizer 110 may generate, for the digital persona 104 that is to be generated for the target person, the plurality of synthetic audio files 112 by generating, based on a plurality of audio file samples of different time intervals (e.g., 5 seconds, 15 seconds, 30 seconds, etc.), for the digital persona 104 that is to be generated for the target person, the plurality of synthetic audio files 112.

Operation of the apparatus 100 is described in further detail with reference to FIGS. 1-10.

Figure 2:
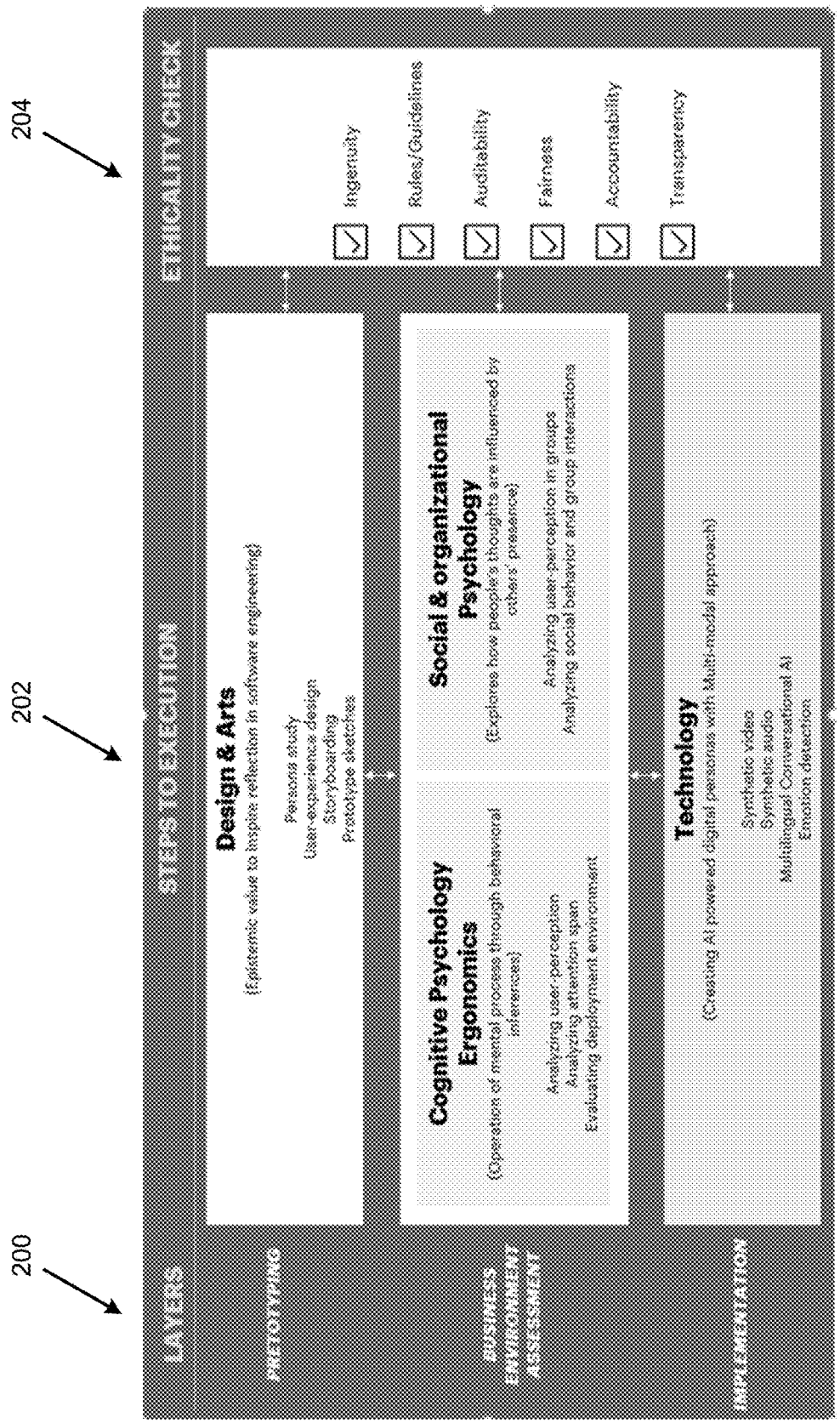
FIG. 2 illustrates a design approach associated with the human centered computing based digital persona generation apparatus of FIG. 1 in accordance with an example of the present disclosure.

FIG. 2 illustrates a design approach associated with the apparatus 100 in accordance with an example of the present disclosure.

With respect to FIG. 2, in order to implement the digital persona 104 in a socially positive (e.g., good) scenario, the apparatus 100 may consider the aspects of the deployment environment, as well as user interactions during deployment. In this regard, the apparatus 100 may implement human centered computing to create a realistic digital persona using, for example, deepfake technology, along with adherence to compliance and ethics. In this regard, the apparatus 100 may create the digital persona 104 by accounting for engagement and satisfaction, support of a multimodal approach by taking into account human feedback for an enhanced experience, respect of individual user behavior during an interaction, reflection of an aim of creating a digital persona, and ethical compliance to reflect trustworthiness and avoiding misuse. For example, FIG. 2 shows the layers of prototyping, business environment assessment, and implementation at 200, steps to execution including design and arts, cognitive psychology ergonomics, social and organizational psychology, and technology at 202, and ethicality check at 204.

Figure 3:
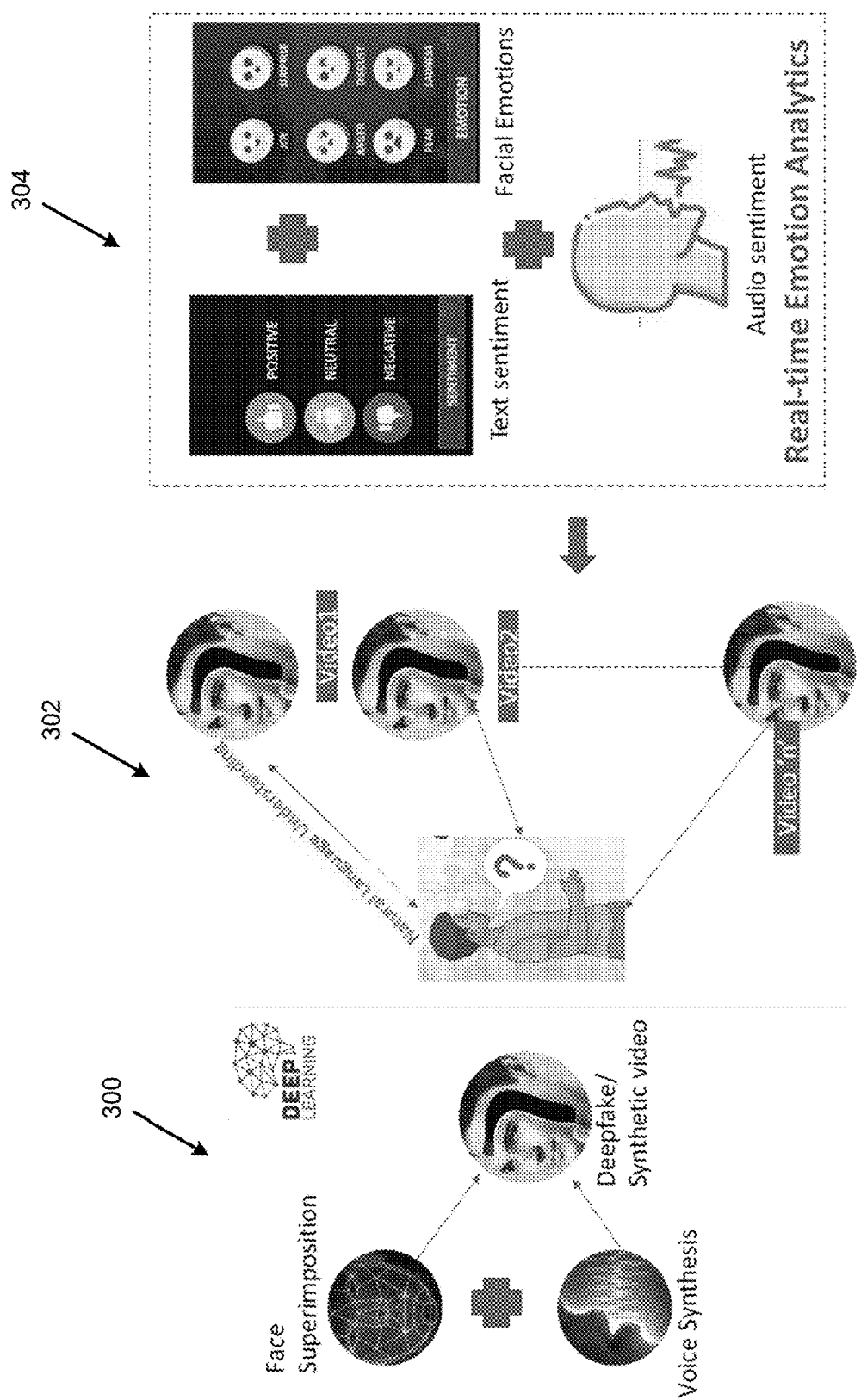
FIG. 3 illustrates a technology landscape associated with the human centered computing based digital persona generation apparatus of FIG. 1 in accordance with an example of the present disclosure.

FIG. 3 illustrates a technology landscape associated with the apparatus 100 in accordance with an example of the present disclosure.

Referring to FIG. 3, the technology landscape associated with the apparatus 100 may include, at 300, the synthetic media files 116 generated by the synthetic media generator 114 based on combination of the synthetic video files 108 and the synthetic audio files 112. At 302, the dialogue and navigation manager 122 may receive, from the user 124 of the generated digital persona 104, an inquiry 126, and utilize, based on an analysis of the inquiry 126 and by the generated digital persona 104, another synthetic media file of the plurality of synthetic media files 116 (illustrated as Video1, Video2, . . . , Video'n') to respond to the inquiry 126. At 304, the real-time emotion analyzer 128 may analyze the real-time emotion 130 of the user 124 by analyzing the text sentiment 132 associated with the inquiry 126, the voice sentiment 134 associated with the user 124, and the facial expression 136 associated with the user 124. Further, at 302, the conversation adapter 138 may utilize, based on the real-time emotion 130 of the user 124 and by the generated digital persona 104, a further synthetic media file of the plurality of synthetic media files 116 to continue or modify the conversation 140 between the generated digital persona 104 and the user 124.

Figure 4:
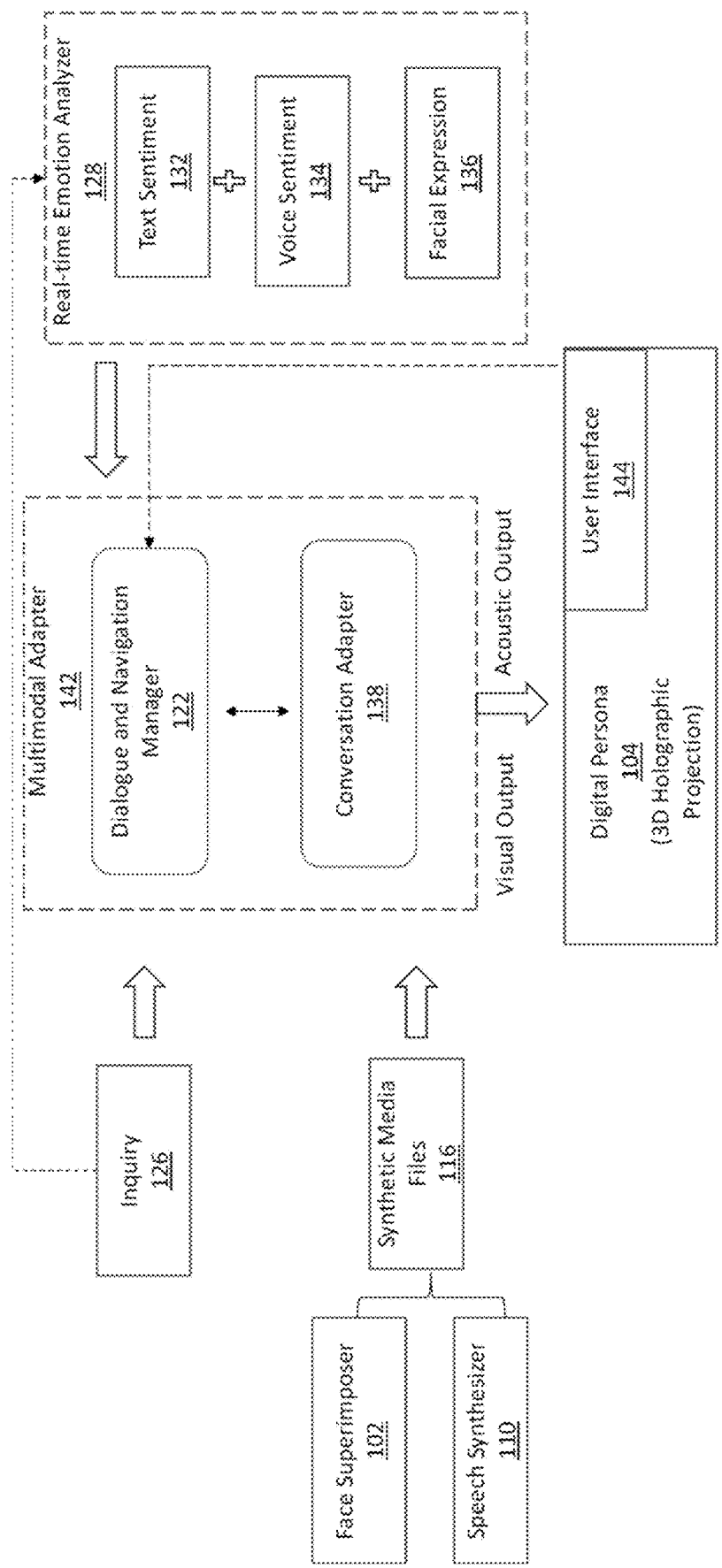
FIG. 4 illustrates interaction of components of the human centered computing based digital persona generation apparatus of FIG. 1 in accordance with an example of the present disclosure.

FIG. 4 illustrates interaction of components of the apparatus 100 in accordance with an example of the present disclosure.

Figure 5:
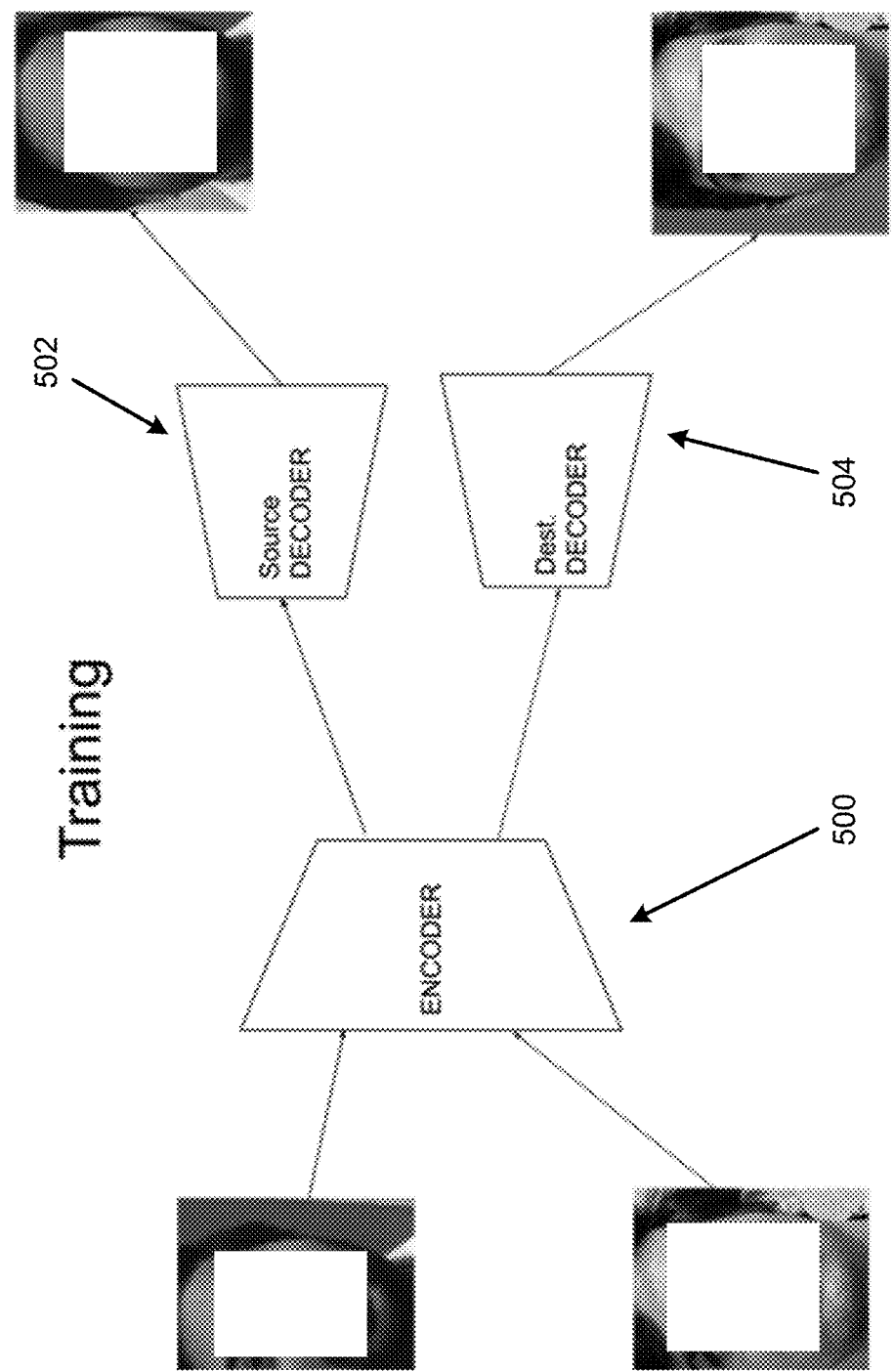
FIG. 5 illustrates an autoencoder architecture for digital persona training to illustrate operation of the human centered computing based digital persona generation apparatus of FIG. 1 in accordance with an example of the present disclosure.
Figure 6:
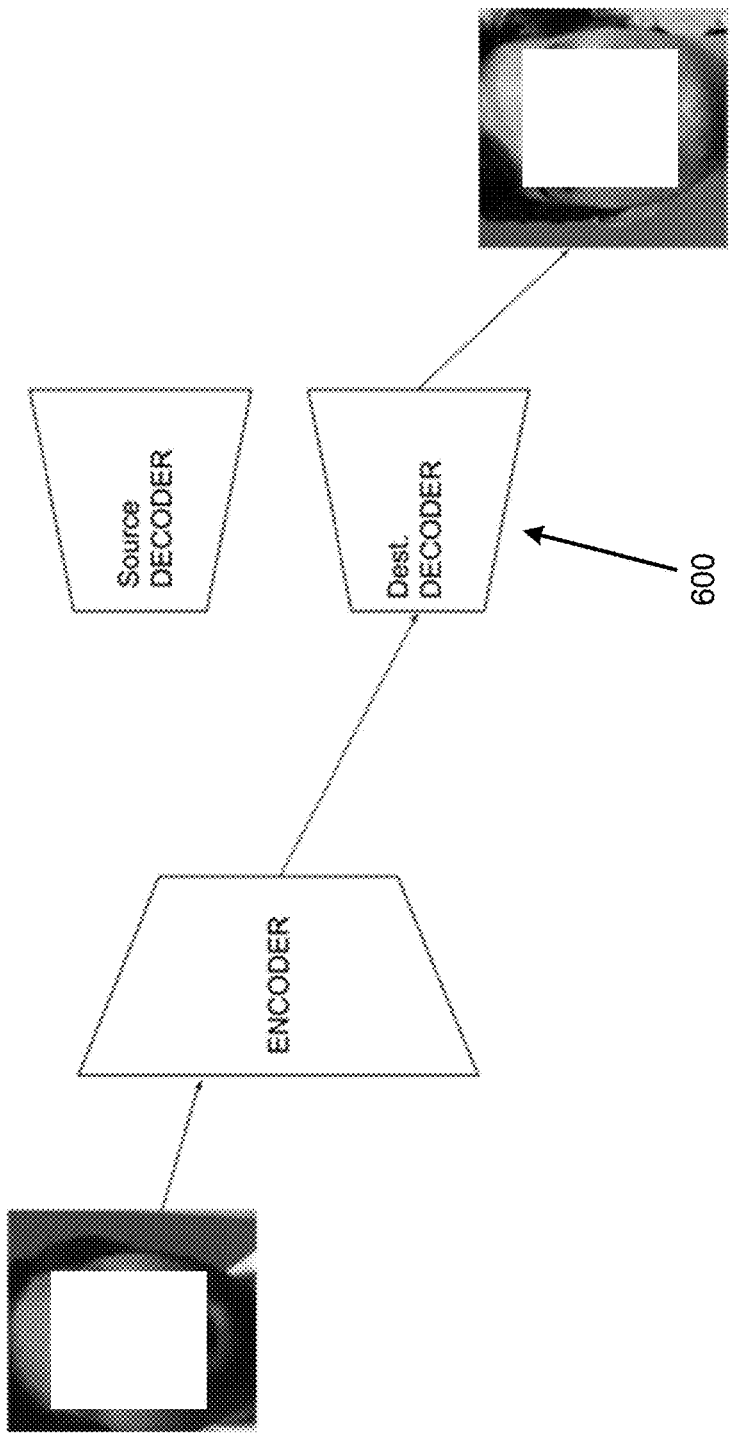
FIG. 6 illustrates generation of digital personas after training to illustrate operation of the human centered computing based digital persona generation apparatus of FIG. 1 in accordance with an example of the present disclosure.

With respect to the multimodal approach implemented by the apparatus 100, the face superimposer 102 may provide for the generation of standalone synthetic video files 108 using deep learning methods. In this regard, as disclosed herein, two autoencoder networks may be trained, with shared weights of encoder network (i.e., a common encoder) and separate decoders for source (e.g., the target person) and destination face (e.g., the face of an actor) as shown in FIG. 5. For the generation part, these architectures may pass the latent representation of source face obtained from the common encoder to the destination face decoder as shown in FIG. 6, thereby converting the source face to the destination face in the process.

The speech synthesizer 110 may provide for the generation of standalone synthetic audio files 112 using deep learning methods. In this regard, an open source framework which is a fully-convolutional sequence-to-sequence model may be used to convert text to spectrograms or other acoustic parameters to be used with an audio waveform synthesis method. Low-dimensional speaker embeddings may be used to model the variability among the thousands of different speakers in a dataset. The sequence-to-sequence model may include an encoder, which maps input to embeddings containing relevant information to the output, and a decoder which generates output from these embedding.

The synthetic video files 108 and the synthetic audio files 112 may be merged, for example, using audio video synchronization, to generate final synthesized videos, where the final synthesized videos may be designated as the synthetic media files 116. A plurality (e.g., 60) of such synthetic media files 116 may be generated, and stored in a database.

A first synthetic media file may be played, and rendered as the digital persona 104 in the form of a holographic projection. The synthetic media file may be sent as an input to a holographic projector with a light source shining through a flat interference pattern that produces an image that has three-dimensional qualities. In this regard, the apparatus 100 may ensure that there is no interruption of voice, and natural language understanding of the user 124 may be triggered. Based on a specific time interval (e.g., 30 seconds) that is set, the dialogue and navigation manager 122 may wait for the user 124 to ask the inquiry 126. Based on the user's inquiry 126, the dialogue and navigation manager 122 may select another synthetic media file to be played as a response to the user's inquiry 126. With respect to a determination of how the conversation adapter 138 decides which synthetic media file to play to answer the user's inquiry, based on natural language understanding of the user's inquiry, a specific intent may be triggered, and a response may be provided as a video name of the associated synthetic media file. This response may represent an input to an executable (which may be built using Python) which may select the correct synthetic media file, and forward it to the holographic projector. This executable may reside in a window machine connected to the projector, and all of the pre-created synthetic media files according to a script may also reside in this machine. This process of playing other synthetic media files may continue until the meaningful conversation ends, or the user wants to stop. If the aforementioned time interval is exceeded, the dialogue and navigation manager 122 may play another synthetic media file to provoke the user 124 to continue the conversation. For example, if meaningful conversation ends, then a "waiting video" may be played where the look of the persona in the video will prompt the user to ask a further question. If user wants to stop and says keywords such as thank you, stop, bye, etc., then a video may be played where the persona says "thank you for your time. Talk to you again soon". At the same time, during playing of any of the synthetic media files 116, the real-time emotion analyzer 128 may monitor the user's behavior by understanding their mood, and performing sentiment analysis (e.g., text sentiment 132, voice sentiment 134, and facial analysis of a facial expression 136 associated with the user 124). If the user's involvement with respect to the user's mood is detected to be low, and the sentiment is determined to be negative, the conversation adapter 138 may play another synthetic media file to suit the user's mood. In this regard, as disclosed herein with respect to FIG. 10, a user's involvement may be determined to be high or low by aggregating the emotion output of voice, face and text with specific weights.

Referring to FIG. 4, the deep learning based face superimposer 102 may generate the synthetic video files 108, and the deep learning based speech synthesizer 110 may generate the synthetic audio files 112, and the synthetic video files 108 and the synthetic audio files 112 may be combined to generate the synthetic media files 116.

The dialogue and navigation manager 122 may determine user interaction information with respect to the inquiry 126 by implementing natural language understanding and natural language processing for dialogue management.

The real-time emotion analyzer 128 may determine the real-time emotion 130 of the user based on the combined power of text sentiment 132, voice sentiment 134, and facial analysis of the facial expression 136 of the user 124.

A multimodal adapter 142 (that may include the dialogue and navigation manager 122, and the conversation adapter 138) may receive, as input, the synthetic media files 116, the user interaction information which may include the inquiry 126 as well as any preferences specified by the user 124, and the real-time emotion 130 of the user from the real-time emotion analyzer 128.

With respect to the synthetic media files 116, deepfakes may represent synthetic video files that are created using deep learning techniques where the target person's face may be inserted into an existing video, and where the target person can be made to appear as if they performed actions in the original video (e.g., by face superimposition). In the generated synthetic media files 116, computer-generated speech may also be integrated. In this regard, the speech synthesizer 110 may leverage deep learning techniques to generate natural sounding speech.

The synthetic media files 116 may be marked with a digital signature to ensure appropriate usage. In this regard, a plurality of synthetic media files (e.g., files including a .mp4 format) may be created based on conversation topics that are to be addressed by the digital persona 104.

In order to enable seamless interaction of the user 124 with the digital persona 104 during a conversation, the dialogue and navigation manager 122 may provide appropriate responses to inquiries by the user 124. The responses may be in the form of one or more appropriate synthetic media files 116.

User preferences on a topic of conversation may also be provided to the dialogue and navigation manager 122, for example, via the inquiries by the user 124, as well as through a user interface 144 associated with the display of the digital persona 104.

The multimodal adapter 142 may implement real-time emotion analytics from the real-time emotion analyzer 128 to analyze user reaction during a conversation. In this regard, the multimodal adapter 142 may adapt, via the conversation adapter 138, a conversation to suit a user's mood. A user's emotions may be aggregated based on inputs of the voice sentiment 134, the text sentiment 132, and facial expression 136. In this regard, the conversation adapter 138 may receive, for example, a single parameter (e.g., the real-time emotion 130) from the real-time emotion analyzer 128. The real-time emotion 130 may represent either a high involvement or a low involvement. The values for the high involvement or the low involvement may be determined by the real-time emotion analyzer 128 as disclosed herein with respect to FIG. 10 by using, for example, support vector machine (SVM). With respect to the text sentiment 132, a user's speech during a conversation may be converted to text, and sentiment analysis may be applied to the generated text to determine whether the sentiment is positive, negative, or neutral. In this regard, a text sentiment analysis service may be utilized to determine the text sentiment 132.

Thus, based on inputs from the dialogue and navigation manager 122, user preferences entered at the user interface 144 (or via the inquiry 126), and the real-time emotion 130 from the real-time emotion analyzer 128, the conversation adapter 138 may identify a synthetic media file to provide a visual output and an acoustic output as an appropriate digital persona 104 that may be projected to the user as a three-dimensional holographic projection. A user preference may represent topics that the user wants to converse about with the digital persona, such as Indian art, Western art, textile art, artifacts, etc.

Face Superimposition

With respect to face superimposition implemented by the face superimposer 102, the apparatus 100 may implement DeepFaceLab™, or other such techniques for face superimposition. In this regard, the face superimposer 102 may ensure that the face superimposition does not include any blurring even if there is a lot of movement. As shown in FIG. 5, the face superimposer 102 may train two autoencoder networks, with shared weights of encoder network (i.e., a common encoder) at 500, and separate decoders for source face (e.g., face of the target person 106) and destination face, respectively at 502 and 504. As shown in FIG. 6, with respect to generation, these architectures may pass the latent representation of a source face obtained from a common encoder to the destination face decoder at 600, thereby converting the source face to the destination face in the process.

The faces that are passed as input to the common encoder for both training and generation may include the aligned faces. The aligned faces may be identified by using a face alignment technique, such as Multi-task Cascaded Convolutional Networks (MTCNN), Single Shot Scale-invariant Face Detector S3FD, etc.

Other enhancements may also be added to increase the quality of the output with respect to face superimposition. For example, jointly training a discriminator network along with the aforementioned encoder decoder network may increase output quality. For example, the decoder network may act as a generator, which may be referred to as GAN based deepfakes. The facial mask size may also be increased to cover more of a forehead for replacement.

With respect to the example disclosed herein for creation of the digital persona of a deceased artist, the artists face (e.g., Face A) may be superimposed on the face of an actor (e.g., Face B). In this regard, in order to ensure that the face superimposition looks as visually perfect as possible, an actor of a similar facial structure, skin tone, hairstyle, and other such features may be preferable.

Other aspects that may be implemented to improve the face superimposition may include utilizing sufficient Face A training data with a criterion that in order to collect the training data, various videos featuring the artist may include the artist front facing the camera, and without any obstructions on the face.

In these video collections, the artist may preferably be of the same age, and lighting in the videos may preferably be consistent. Also in the videos, the artist may preferably be front facing a camera in most of the frames. With respect to this criteria, for a collection of approximately 10 minutes of video, approximately 9000 image frames may be extracted.

With respect to sufficient Face B training data with a certain criterion, in order to obtain training data, a video shoot of the actor may be obtained for a duration, for example, of 10 minutes. During the video shoot, the actor may be directed to be both front facing for a certain amount of time, and side facing for another amount of time. The actor may also be directed to exhibit varied expressions, and lighting during the video shoot may primarily be in the front of the actor.

With respect to preprocessing of training data, once the videos of the artist (e.g., Face A) have been collected, frames consisting of other people may be removed, for example, using a video cutter. The cut portions of a video may be stitched back together before using the video as input, for example, to the DeepFaceLab™ software.

Figure 7:
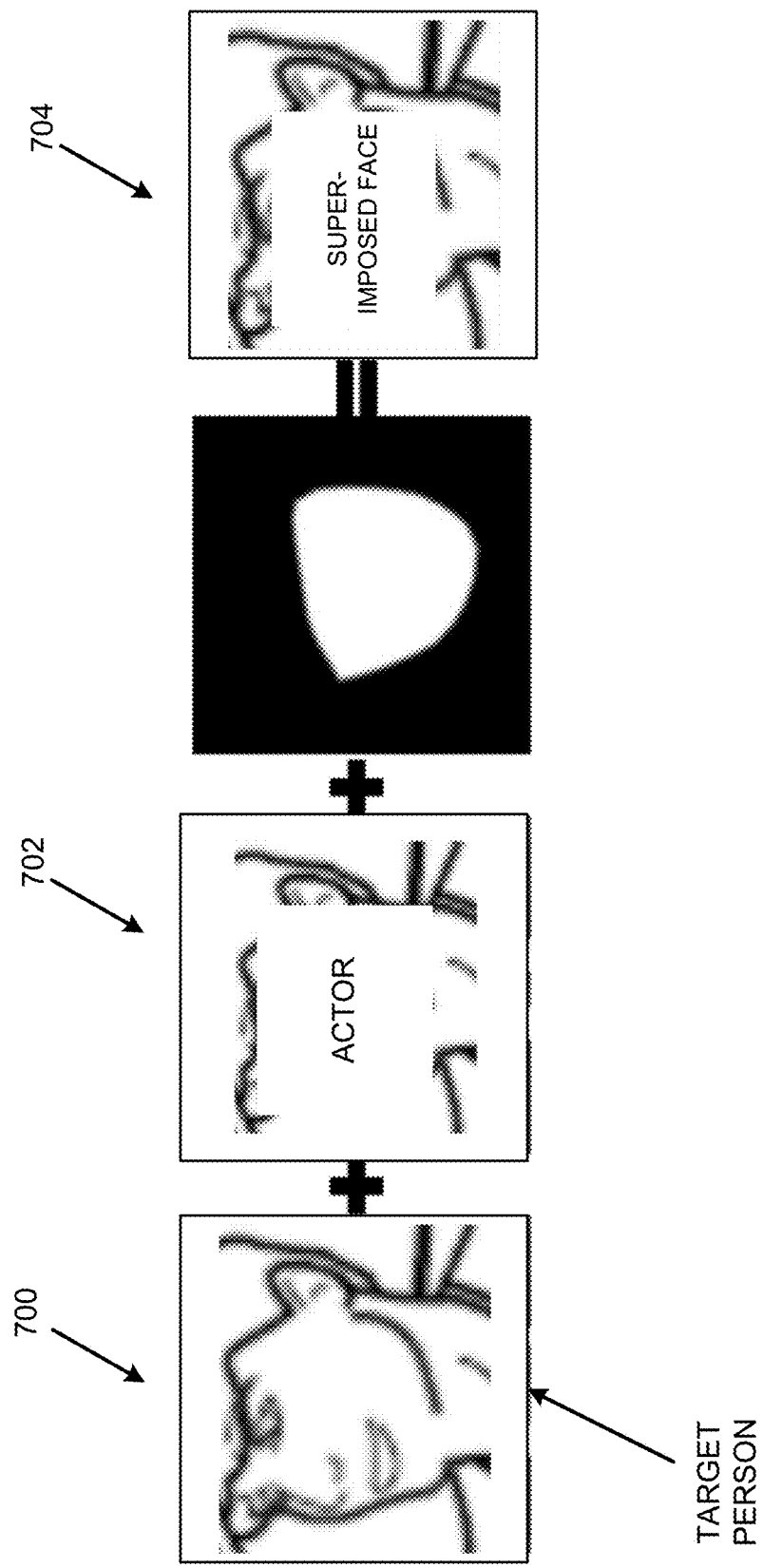
FIG. 7 illustrates an example of operation of a face superimposer to illustrate operation of the human centered computing based digital persona generation apparatus of FIG. 1 in accordance with an example of the present disclosure.

FIG. 7 illustrates an example of operation of the face superimposer 102 to illustrate operation of the apparatus 100 in accordance with an example of the present disclosure.

Referring to FIG. 7, with respect to face superimposition as also disclosed herein with respect to FIGS. 5 and 6, for FIG. 7, a face of the target person 106 for whom the digital persona 104 is to be generated shown at 700. At 702, a face of another person (e.g., an actor) may be superimposed on the face of the target person 106 for whom the digital persona 104 is to be generated. The resulting superimposed face of the other person onto the face of the target person is shown at 704.

For the face superimposition example of FIG. 7, in a similar manner as disclosed herein with respect to FIGS. 5 and 6, for FIG. 7, an actor may need to be identified. The look and style of the actor may be finalized based on the style of the target person 106 for which the digital persona 104 is to be generated. In order to improve accuracy of the digital persona 104, the actor that is identified for the digital persona 104 may preferably include a similar face, skin tone, jawline, hairstyle, and other relevant features as the actual person. Since an end outcome of the digital persona 104 may include a full-length persona, the actor may also need to be trained to walk, sit, stand, and dress in a similar manner as the target person 106. The actor may then read from a specified script that is based on an intended conversation of the user 124 with the digital persona 104. Any video captured for generation of the synthetic video files 108 may be captured based on specifications needed for the holographic projection 120 of the digital persona 104. A specified length of the actor's video (e.g., destination) and a specified length of the target person's video (e.g., source) may be obtained. In this regard, the specified length may include, for example, 10 to 15 minutes of the actor's video and the target person's video. With respect to the source video that represents the target person's video, lighting conditions in this video may be matched to lighting conditions of the destination video that represents the actor's video.

Once appropriate videos are obtained, a deepfake framework may be utilized to extract frames from the source videos that represent the target person's videos and the destination videos that represent the actor's videos. In this regard, a DeepFaceLab™ framework may be utilized to extract frames. Based on the extracted frames, faces may be extracted. Face extraction may be cleaned up by removing faces which are blurred, unclear background, and removing images which have a number of specified types of pixels, such as black pixels. The dialogue and navigation manager 122 may be trained on "user utterances" so that the dialogue and navigation manager 122 determines which synthetic media file to be played for a specified utterance. The dialogue and navigation manager 122 may use speech recognition, a chatbot (e.g., the conversation adapter 138), and a database of intent-video mapping. For example, if the user 124 states "Hi/Nola/Hello/Hi there/Hey/Greetings, etc." which are variations of a greeting, the speech synthesizer 110 may convert the speech to text, and the text may be passed to the chatbot. The chatbot may be trained on text utterances, and return an intent named "IntroIntent". Once the dialogue and navigation manager 122 receives the response from the chatbot as "IntroIntent", the dialogue and navigation manager 122 may analyze a database table mapping to identify that "IntroIntent" corresponds to which synthetic media file. The appropriate synthetic media file may be selected as per the table mapping, and may be displayed as part of the holographic projection 120.

With respect to the synthetic video files 108, conversion parameters for a perfect synthetic video file may include mask extension, where the face detection returns the face in an image along with facial landmark points such as ear, nose, etc. The mask may represent the boundary of the face that is to be replaced. Using these points, as shown in FIG. 8, a mask may be determined as a convex hull of a specified number of points, such as 68 point. By default, the mask may cover a part of the face from the person's eyebrows until their chin. Other parameters may include mode, mask mode, blur mask, color mode, and super resolution. With respect to mode, an "overlay" may overlay the generated part of a face as it is on the actor's face. A mask mode may be used to define the contours of the mask. A blur mask may include an integer in the range [−400,400], where the blur mask may represent a parameter used to mark the boundary post the face superimposition. Without blurring of the mask, the outline of the mask may be visible in the final output generated. In this regard, a relatively smaller value may tend to make the boundary between the mask and rest of actor's face very clear, and relatively large value may blur the skin tone unnecessarily in excess. The color mode may be used to match the actor and target person's color tones. Further, super resolution may enhance details in the learned face if used.

Speech Synthesis

With respect to speech synthesis, for the aforementioned example of the deceased artist for who the digital persona is to be created, a voice of the artist may also need to be synthesized by the speech synthesizer 110. In order to implement the speech synthesis, various speech synthesizing techniques may be utilized. One such speech synthesizing technique may include DeepVoice3™. Assuming that a resource domain with respect to the voice of the target person 106 includes a limited amount of voice data, the speech synthesizer 110 may utilize voice data to generate the synthetic audio files 112. For example, assuming that the resource domain includes a pre-existing video of the target person 106, audio in .mp3 format may be extracted from this video, and a plurality of samples of audio files of different time intervals (e.g., five seconds, six seconds, nine seconds, etc.) may be generated. These examples of audio files may result, for example, in 20 to 30 minutes of voice data. Along with the audio samples, corresponding text may also be extracted from each sample for training. In this regard, a speech recognition application programming interface (API) may be utilized to extract text. A speaker adaptation technique may be used to generate synthetic audio files from the extracted text.

After creation of the synthetic audio files 112, the synthetic audio files 112 may be merged with the synthetic video files 108 as disclosed herein to generate the synthetic media files 116. During creation of the synthetic video files 108, the actor may be directed to speak as per a relevant conversation topic for the digital persona 104. Thus, during merging of the synthetic video files 108 and the synthetic audio files 112, lip synchronization may be automatically accounted for.

With respect to generation of the synthetic audio files 112, the speech synthesizer 110 may ascertain voice data. For example, as disclosed herein, the speech synthesizer 110 may ascertain a plurality of samples of audio files of different time duration such as five seconds, six second, nine seconds and ten seconds. In this regard, a goal of the speech synthesis may include generating synthetic audio files of a specified total time duration for the target person 106, such as, for example, at least 25 minutes. According to an example, a total of 29.08 minutes of the synthetic audio files 112 may be obtained based on three samples each of ten sec=3*10=30 seconds, fifty-four samples each of nine sec=54*9=486 seconds, ninety-nine samples each of six sec=99*6=594 seconds, and one-hundred twenty-seven samples each of five sec=127*5=635 seconds (e.g., total 283 samples of (1745 sec/60)=29.08 minutes). The speech synthesizer 110 may utilize a pre-trained speech synthesis deep learning model. The deep learning model may be retrained based on the aforementioned voice samples of the target person 106 (e.g., the deceased artist).

In some cases, text to speech (TTS) synthesis architectures may specify training data of approximately twenty-four hours. In this regard, the speech synthesizer 110 may be implemented to utilize a limited amount (e.g., 20-30 minutes) of the target person's speech. The training data for the speech synthesizer 110 may be prepared for audio model generation. In this regard, along with audio samples, corresponding text may be extracted from each audio sample for training.

Conversation Artificial Intelligence

The requirement of the digital persona 104 may include having a conversation with the user 124 about a relevant topic (e.g., art). In this regard, natural language processing and natural language understanding technology may be implemented to understand an intent of the user 124, and respond in a useful way. An API, such as a Dialogflow™ API, may be implemented in conjunction with the conversation adapter 138. The conversation may be designed in an inquiry/answer format. Thus, for any inquiry 126 presented by the user 124, a specific synthetic media file of the digital persona 104 answering the inquiry 126 may be provided as a response. In order for the conversation adapter 138 to select a specific synthetic media file to respond to an inquiry 126, based on natural language understanding of the user's inquiry, a specific intent may be triggered, and a response may be provided as a video name of one of the synthetic media files. This response may represent an input to an executable (which may be built using Python) which may select the correct synthetic media file, and forward it to the holographic projector. This executable may reside in a window machine connected to the projector, and all of the pre-created synthetic media files according to a script may also reside in this machine. The response video, which may be an output media file in a MP4 format, may then be projected on a three-dimensional holographic stage.

The conversational AI implemented by the conversation adapter 138 may thus understand speech of the user 124, for example, by performing natural language understanding. Based on this understanding of speech of the user 124, the conversational AI may provide for playing of the appropriate synthetic media file to the user to continue the conversation 140. The conversational AI may understand user emotion to determine involvement level. In this regard, if the involvement level is greater than a specified threshold (e.g., 50%), the conversation may continue, or else, another synthetic media file may be played for the digital personal 104.

Figure 9:
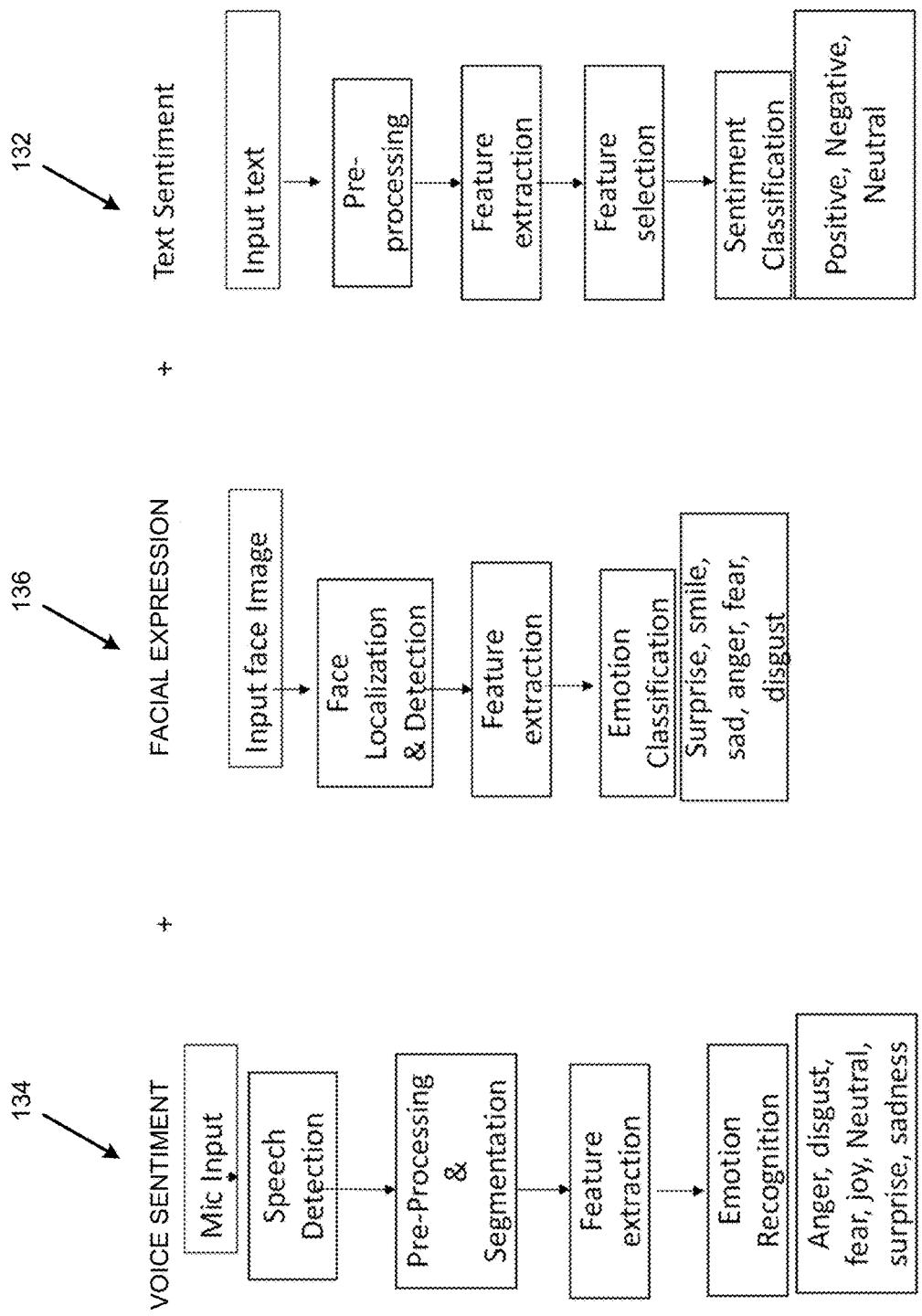
FIG. 9 illustrates involvement level determination to illustrate operation of the human centered computing based digital persona generation apparatus of FIG. 1 in accordance with an example of the present disclosure.

FIG. 9 illustrates involvement level determination to illustrate operation of the apparatus 100 in accordance with an example of the present disclosure.

Referring to FIG. 9, with respect to involvement level determination by the conversation adapter 138, involvement level may be determined as a function of the text sentiment 132 associated with the inquiry 126, the voice sentiment 134 associated with the user 124, and the facial expression 136 associated with the user 124.

Text sentiment determination may include, for example, receiving of input text, pre-processing of the input text, feature extraction, feature selection, and sentiment classification as positive, negative, or neutral. For example, a text analytics application programming interface (API) may be utilized to determine text sentiment.

Voice sentiment determination may include, for example, receiving a mic input, speech detection, pre-processing and segmentation, feature extraction, emotion recognition, for example, as anger, disgust, fear, joy, neutral, surprise, or sadness. For example, a voice emotion recognition model may be utilized for voice emotion recognition.

Facial expression determination may include, for example, receiving of an input face image, face localization and detection, feature extraction, and emotion classification, for example, as surprise, smile, sad, anger, fear, or disgust. For example, a facial expression detection application programming interface (API) may be utilized to determine facial expressions.

Figure 10:
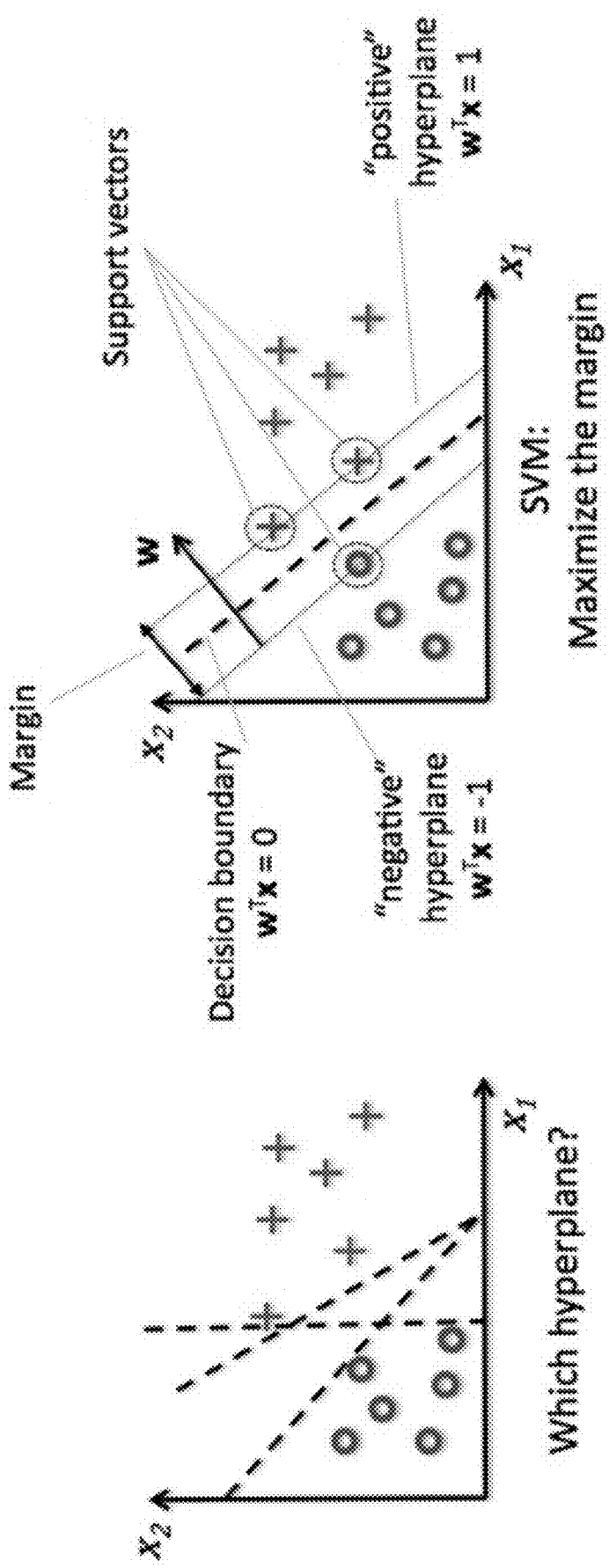
FIG. 10 illustrates further details of involvement level determination utilizing support vector machine (SVM) to illustrate operation of the human centered computing based digital persona generation apparatus of FIG. 1 in accordance with an example of the present disclosure.

FIG. 10 illustrates further details of involvement level determination utilizing support vector machine (SVM) to illustrate operation of the apparatus 100 in accordance with an example of the present disclosure.

Referring to FIG. 10, with respect to classification of the involvement level of user 124 with the digital persona 104 as high or low, a radial basis function (RBF) kernel support vector machine (SVM) may be trained on manually annotated data obtained from different users' experiences. The data may be annotated to be positive or negative indicating high versus low involvement. The RBF kernel SVM may be trained on a plurality of real valued features that include users' emotional responses while interacting with the digital persona 104. The user's facial emotion, voice (audio) emotions, and text emotions (e.g., the text spoken while interacting with the digital person 104) may also be captured. Text emotions may include three features depicting positive, negative, or neutral text emotions. Facial emotions may include eight features depicting anger, contempt, disgust, fear, happiness, neutral, sadness or surprise facial emotions. Further, audio emotions may include seven features depicting joy, surprise, neutral, anger, disgust, sadness or fear audio emotions. Each of the text, facial, and audio sentiment features may be probability distributions representing the probabilities over a multinomial set of emotions. For example, for the text sentiment the positive, negative and neutral features may all be positive and sum to 1 (and likewise for facial and audio features). The trained SVM may be used for predicting the new user involvement to be high or low, given all the of the aforementioned feature values for the emotions. The SVM classifier that is used to predict the involvement level may represent a maximum margin classifier that receives as input the aforementioned features (e.g., $x^1; x^2; \ldots, x^{18}$) and predicts $\hat{y}$ (e.g., the involvement level) as follows:

$$\hat{y}=f(x^1,x^2,\ldots,x^{18}).$$

An objective that SVM may attempt to solve is to find a linear classifier that separates positive and negative examples, and is at maximum distance to the closest point to the classifier as follows:

$$\operatorname*{argmax}_{w,b}\left\{\frac{1}{\|w\|}\min_i (w^T \phi(x_i)+b)y_i\right\}$$

In this regard, $\phi(x)$ may represent feature space transformation, and $y_i$ may represent an actual label of high or low involvement. Since scaling of weights w, b by any positive constant does not change the classifier, $(w^T\phi(r_i)+b)y_i=1$ may be set for the point closest to the classifier as follows:

$$\min_{w,b} \|w\|^2$$
$$\text{s.t.} \quad y_i(w^T\phi(x_i)+b) \geq 1$$

In this regard, data may be linearly separable in feature space, and slack variables ξ may be utilized to allow for misclassification of some points, with the new objective becoming:

$$\min_{w,b,\xi} \|w\|^2 + C\sum_{i=1}^{N} \xi_i$$
$$\text{s.t.} \quad y_i(w^T\phi(x_i)+b)+\xi_i \geq 1, \xi_i \geq 0$$

Emotion Analytics

With respect to real-time emotion analytics, the real-time emotion analyzer 128 may collect data, and perform analysis on how people communicate verbally and nonverbally to understand the mood or emotions of the person at an interval of time. In order to avoid monotonous conversations between the digital persona 104 and the user 124, the real-time emotion analyzer 128 may implement emotion analytics. The real-time emotion analyzer 128 may detect various emotions of the user 124 as an aggregate of the outcome of voice sentiment 134, text sentiment 132, and facial emotions based on a facial expression 136 of the user 124. Based on the involvement level and emotion detection, a conversation with the digital persona 104 may be changed to suit a mood of the user 124. In this regard, conversation changes may be based on involvement level. If involvement level is low, this parameter may be passed as an input to the conversation adapter 138. Various synthetic media files may be created to redirect the user 124 to converse on a different topic. If the involvement level is low, the current conversation may be halted and the digital persona 104 may ask the user 124 to switch to a different topic of interest. In this regard, involvement may be referred to a measure of user engagement during the conversation with the digital persona 104. Involvement of the user 124 may be tracked through eye movement. For example, if the detected involvement level drops to less than a specified threshold, such as 50%, the conversation may be changed to a different topic, for example, to change a mood of the user 124, or to grab the attention of the user 124 through a different dialogue response. With respect to user involvement, eye movement may also be detected through an eye tracking technique to measure the gaze of the user 124 to thereby determine alertness. The gaze of the user 124 may be measured for a duration of 50 seconds. For multiple users, an average score may be considered.

Cognitive Psychology and Ergonomics

With respect to cognitive psychology, this type of psychology may use computers to study human mental phenomena for the sake of developing general theories about human behavior. Cognitive ergonomics may include the study of mental phenomena, and application of theoretical knowledge in order to solve practical problems related to using computers. Cognitive ergonomics may be based on psychological phenomena, such as knowledge, perception, and planning. Cognitive ergonomics may focus on making systems relatively simple and easy to use by analyzing human perception and mental processing.

By understanding cognitive psychology and ergonomics, operation of the apparatus 100 may be based on the understanding of factors such as user behavior and needs, measuring user satisfaction, planning content (e.g., understanding how information is organized and presented to the users), facilitating actions which are easy to access and use, focusing on accessibility as to how a disabled person can use the apparatus 100, and collecting user feedback and improving functionality of the apparatus 100. For example, in order to generate the digital persona 104 based on the aforementioned factors, an understanding of how the user 124 will interact with the digital persona 104, what will likely be of interest to the user 124, and how the digital persona 104 should adapt to support the user's needs may need to be analyzed by the apparatus 100. In order to meet these criteria, the apparatus 100 may implement the digital persona 104 as the holographic projection 120. The utilization of the holographic projection may enable a relatively large number of users (e.g., visitors to a museum or another location with the digital persona 104) to interact with the digital persona 104, for example, of the deceased artist as disclosed herein. A distance of the projection may be designed to ensure people sitting, for example, on wheelchairs also could watch the experience without interruption. Since the distance may be selected by considering accessibility, the synthetic video files 108 of the actor may include the entire body of the actor. In this regard, implementation of the holographic projection 120 of the digital persona 104 may also be visually appealing to the user 124.

A conversation with the digital persona 104 may be designed to be related, for example, to the deceased artist for the examples disclosed herein, as well as art generally. In this regard, the natural language understanding and natural language processing techniques implemented for the dialogue and navigation manager 122 may be built in with multilingual understanding (NLU). In order to minimize errors occurring due to aspects such as a noisy environment, speaker accent, speaker interruption, self-correction, etc., a moderator may be utilized to implement a controlled environment with a noise reduction handheld mic with master/slave configuration to be provided to the user 124 so that there could be only one single user interacting with the digital persona 104 at any given time.

In order to facilitate user feedback and to adapt to an individual user's attention span, as disclosed herein, emotion analytics may be implemented by the real-time emotion analyzer 128. With respect to collection of the real-time emotion 130 of the user 124, a video camera may be installed on a screen associated with the holographic projection. In this regard, since the digital persona 104 may be projected as a hologram in a dark room, the video camera installed on the screen may be utilized to capture emotions of the user 124 in dim light.

Social and Organizational Psychology

While cognitive psychology and ergonomics may represent the study of human behavior in a single user environment, social and organizational psychology may be concerned with the study of interpersonal, group, inter-group, and inter-organization behavior. The social and organizational psychology may review how interactions may be understood and modified with various types of interventions.

Applying social and organization psychology for creation of the digital persona 104, views of the deployment environment may be obtained. Group behavior which involved interactions among individuals post their experience with the digital persona 104 may also be analyzed.

Design and Arts

An idea within human centered computing may include formalizing the arts as a source of inspiration. In this regard, artistic research may have an epistemic value, and artworks may inspire reflection within software engineering. Further, artworks dealing with functional realism, media realism, and illusionistic realism may be combined in the same artwork.

Ethics

With respect to ethics, since the apparatus 100 provides for application of deepfake technology for a positive purpose, the digital persona 104 may need to be created ethically. In this regard, accountability and transparency may be used to report, explain the algorithm decision-making, secure training data, as well as to mitigate any negative social impact. In order to minimize negative social impact, the apparatus 100 may utilize secure communication channels, and deploy the digital persona 104 in a controlled environment with authorized access to generate the holographic projection. Transparency may be achieved by making the data and code associated with the digital persona 104 available, as well as decisions taken during development of the apparatus 100.

With respect to the synthetic video files 108, fingerprinting may be used with encryption while creating the synthetic video files 108 to ensure authorized use during deployment of the digital persona 104. The fingerprinting may be performed through encryption of the video files using video encryption tools such as AxCrypt. Further, for the example of the deceased artist as disclosed herein, permission and consent may be taken from the artist or a rightful heir of the artist.

Ingenuity in artificial intelligence and technology development may need to be tempered with integrity, values, governance, policy, and legal consequences for misconduct. These issues may represent collectively informed public solutions, with input from industry, consumers, government regulators, etc. These issues may be addressed, for example, by determining whether consent has been obtained from both parties (e.g., the actor and the target person 106 represented by the digital persona 104), to ensure that the message conveyed by the digital persona 104 is trustworthy.

Figure 11:
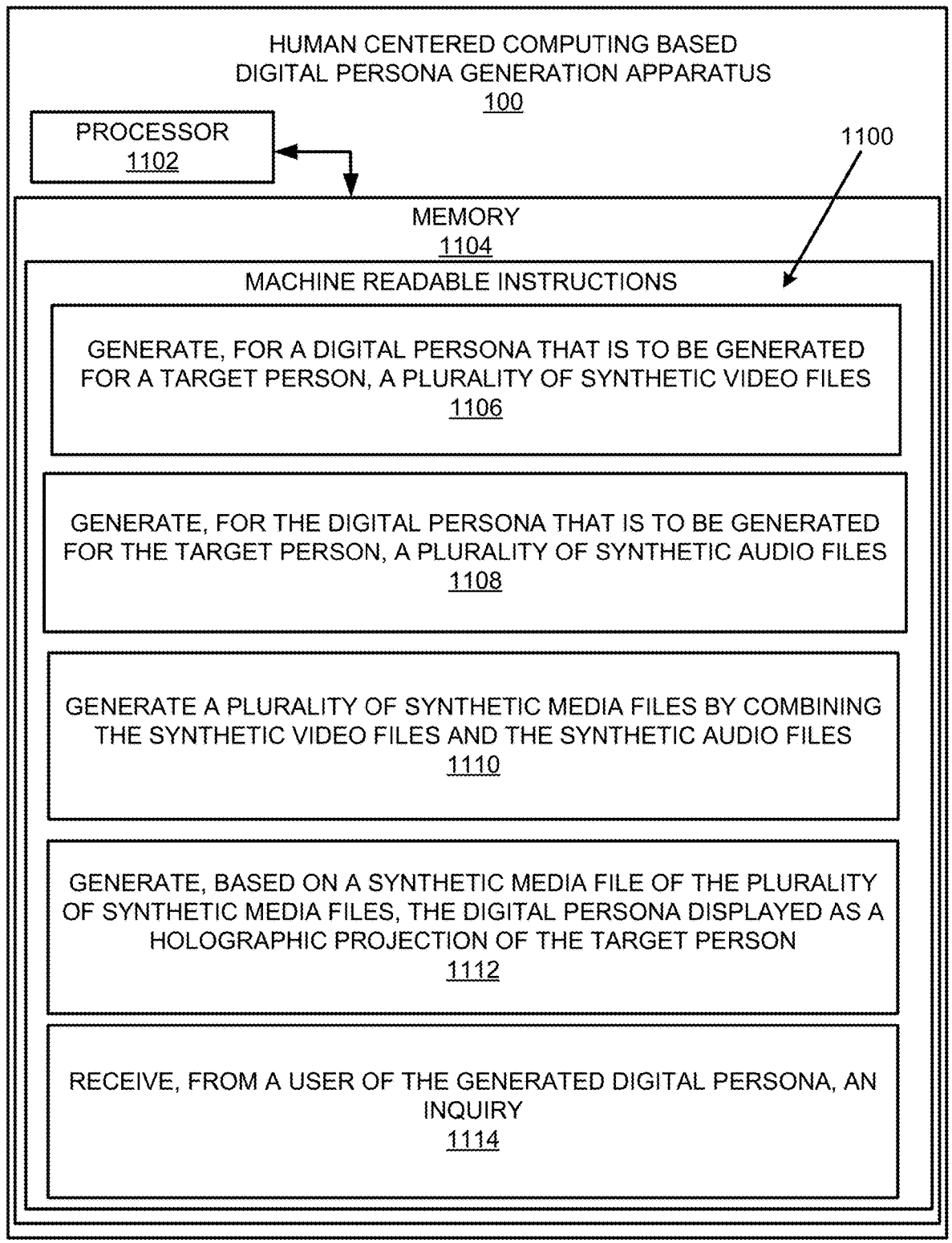
FIG. 11 illustrates an example block diagram for human centered computing based digital persona generation in accordance with an example of the present disclosure.
Figure 11:
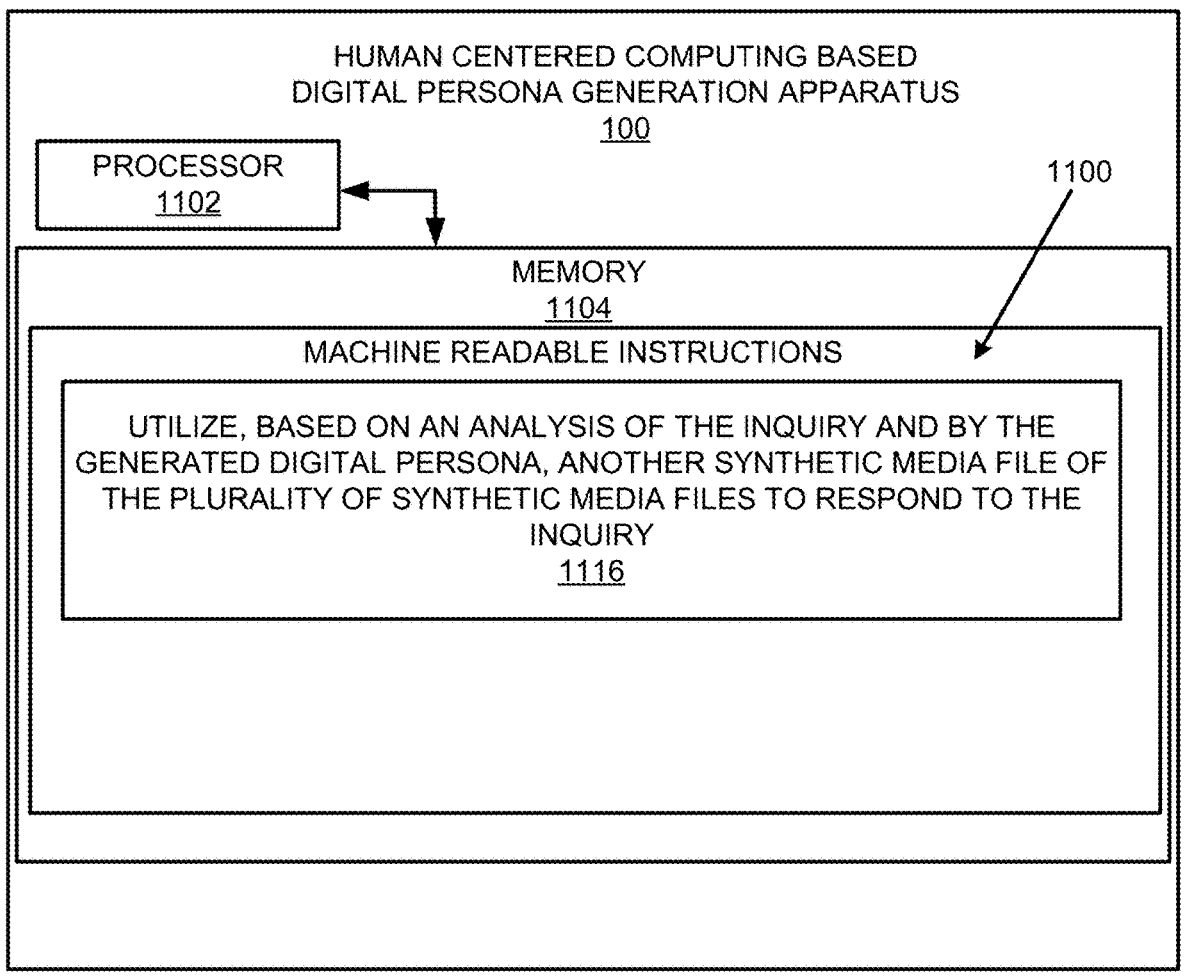
Figure 13:
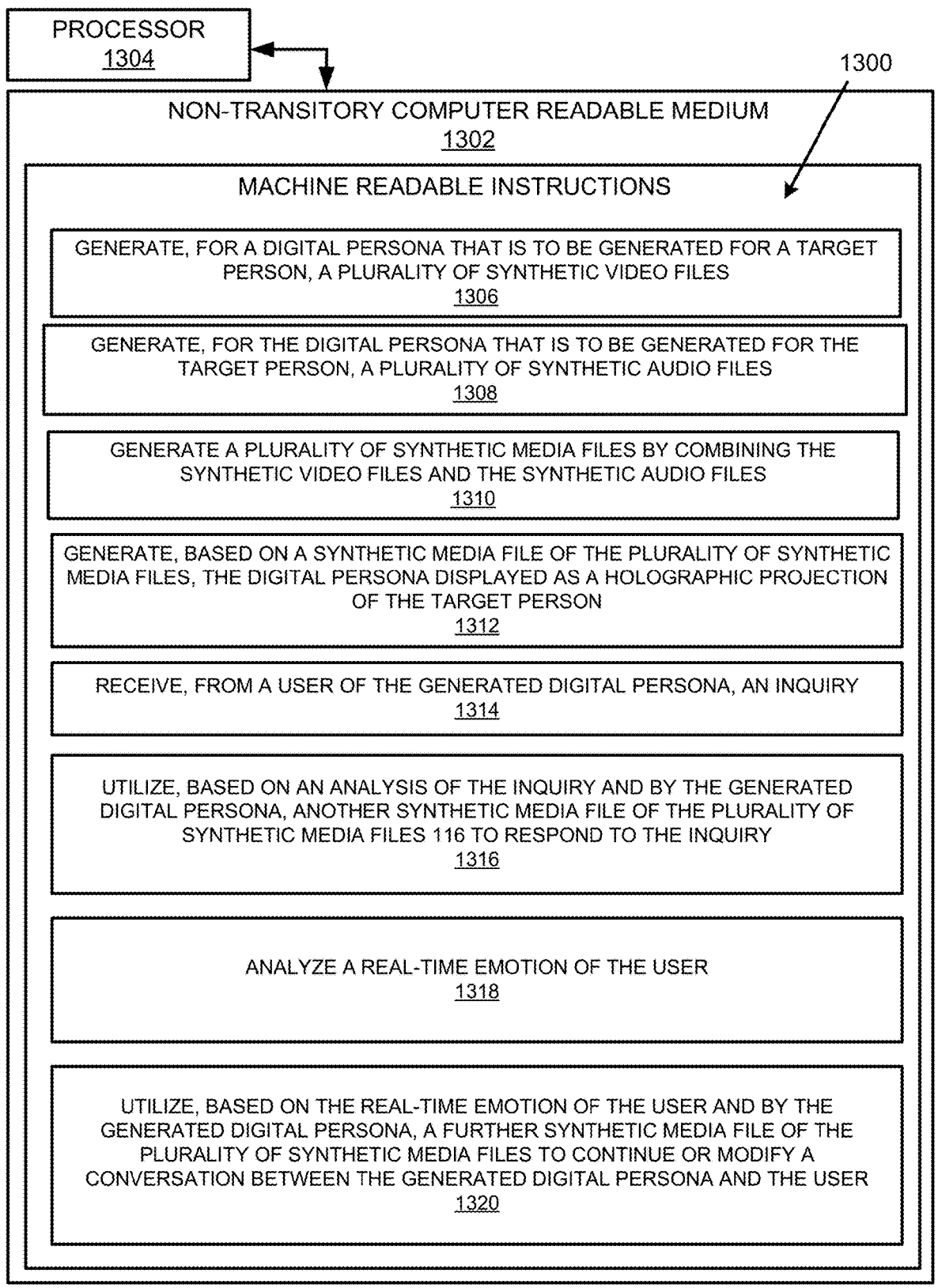
FIG. 13 illustrates a further example block diagram for human centered computing based digital persona generation in accordance with another example of the present disclosure.

FIGS. 11-13 respectively illustrate an example block diagram 1100, a flowchart of an example method 1200, and a further example block diagram 1300 for human centered computing based digital persona generation, according to examples. The block diagram 1100, the method 1200, and the block diagram 1300 may be implemented on the apparatus 100 described above with reference to FIG. 1 by way of example and not of limitation. The block diagram 1100, the method 1200, and the block diagram 1300 may be practiced in other apparatus. In addition to showing the block diagram 1100, FIG. 11 shows hardware of the apparatus 100 that may execute the instructions of the block diagram 1100. The hardware may include a processor 1102, and a memory 1104 storing machine readable instructions that when executed by the processor cause the processor to perform the instructions of the block diagram 1100. The memory 1104 may represent a non-transitory computer readable medium. FIG. 12 may represent an example method for human centered computing based digital persona generation, and the steps of the method. FIG. 13 may represent a non-transitory computer readable medium 1302 having stored thereon machine readable instructions to provide human centered computing based digital persona generation according to an example. The machine readable instructions, when executed, cause a processor 1304 to perform the instructions of the block diagram 1300 also shown in FIG. 13.

The processor 1102 of FIG. 11 and/or the processor 1304 of FIG. 13 may include a single or multiple processors or other hardware processing circuit, to execute the methods, functions and other processes described herein. These methods, functions and other processes may be embodied as machine readable instructions stored on a computer readable medium, which may be non-transitory (e.g., the non-transitory computer readable medium 1302 of FIG. 13), such as hardware storage devices (e.g., RAM (random access memory), ROM (read only memory), EPROM (erasable, programmable ROM), EEPROM (electrically erasable, programmable ROM), hard drives, and flash memory). The memory 1104 may include a RAM, where the machine readable instructions and data for a processor may reside during runtime.

Referring to FIGS. 1-11, and particularly to the block diagram 1100 shown in FIG. 11, the memory 1104 may include instructions 1106 to generate, for a digital persona 104 that is to be generated for a target person 106, a plurality of synthetic video files 108.

The processor 1102 may fetch, decode, and execute the instructions 1108 to generate, for the digital persona 104 that is to be generated for the target person 106, a plurality of synthetic audio files 112.

The processor 1102 may fetch, decode, and execute the instructions 1100 to generate a plurality of synthetic media files 116 by combining the synthetic video files 108 and the synthetic audio files 112.

The processor 1102 may fetch, decode, and execute the instructions 1112 to generate, based on a synthetic media file of the plurality of synthetic media files 116, the digital persona 104 displayed as a holographic projection 120 of the target person 106.

The processor 1102 may fetch, decode, and execute the instructions 1114 to receive, from a user 124 of the generated digital persona 104, an inquiry 126.

The processor 1102 may fetch, decode, and execute the instructions 1116 to utilize, based on an analysis of the inquiry 126 and by the generated digital persona 104, another synthetic media file of the plurality of synthetic media files 116 to respond to the inquiry 126.

Referring to FIGS. 1-10 and 12, and particularly FIG. 12, for the method 1200, at block 1202, the method may include generating, for a digital persona 104 that is to be generated for a target person 106, a plurality of synthetic video files 108.

At block 1204, the method may include generating, for the digital persona 104 that is to be generated for the target person 106, a plurality of synthetic audio files 112.

At block 1206, the method may include generating a plurality of synthetic media files 116 by combining the synthetic video files 108 and the synthetic audio files 112.

At block 1208, the method may include generating, based on a synthetic media file of the plurality of synthetic media files 116, the digital persona 104 displayed as a holographic projection 120 of the target person 106.

Referring to FIGS. 1-10 and 13, and particularly FIG. 13, for the block diagram 1300, the non-transitory computer readable medium 1302 may include instructions 1306 to generate, for a digital persona 104 that is to be generated for a target person 106, a plurality of synthetic video files 108.

The processor 1304 may fetch, decode, and execute the instructions 1308 to generate, for the digital persona 104 that is to be generated for the target person 106, a plurality of synthetic audio files 112.

The processor 1304 may fetch, decode, and execute the instructions 1310 to generate a plurality of synthetic media files 116 by combining the synthetic video files 108 and the synthetic audio files 112.

The processor 1304 may fetch, decode, and execute the instructions 1312 to generate, based on a synthetic media file of the plurality of synthetic media files 116, the digital persona 104 displayed as a holographic projection 120 of the target person 106.

The processor 1304 may fetch, decode, and execute the instructions 1314 to receive, from a user 124 of the generated digital persona 104, an inquiry 126.

The processor 1304 may fetch, decode, and execute the instructions 1316 to utilize, based on an analysis of the inquiry 126 and by the generated digital persona 104, another synthetic media file of the plurality of synthetic media files 116 to respond to the inquiry 126.

The processor 1304 may fetch, decode, and execute the instructions 1318 to analyze a real-time emotion 130 of the user 124.

The processor 1304 may fetch, decode, and execute the instructions 1320 to utilize, based on the real-time emotion 130 of the user 124 and by the generated digital persona 104, a further synthetic media file of the plurality of synthetic media files 116 to continue or modify a conversation 140 between the generated digital persona 104 and the user 124.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A human centered computing based digital persona generation apparatus comprising:
   a face superimposer, executed by at least one hardware processor, to
      generate, for a digital persona that is to be generated for a target person, a plurality of synthetic video files;
   a speech synthesizer, executed by the at least one hardware processor, to
      generate, for the digital persona that is to be generated for the target person, a plurality of synthetic audio files;
   a synthetic media generator, executed by the at least one hardware processor, to generate a plurality of synthetic media files by combining the synthetic video files and the synthetic audio files;
a digital persona generator, executed by the at least one hardware processor, to
generate, based on a synthetic media file of the plurality of synthetic media files, the digital persona displayed as a holographic projection of the target person;
a dialogue and navigation manager, executed by the at least one hardware processor, to
receive, from a user of the generated digital persona, an inquiry, and
utilize, based on an analysis of the inquiry and by the generated digital persona, another synthetic media file of the plurality of synthetic media files to respond to the inquiry; and
a real-time emotion analyzer, executed by the at least one hardware processor, to
analyze a real-time emotion of the user by analyzing a text sentiment associated with the inquiry, a voice sentiment associated with the user, and a facial expression associated with the user.

2. The human centered computing based digital persona generation apparatus according to claim 1, further comprising:
a conversation adapter, executed by the at least one hardware processor, to
utilize, based on the real-time emotion of the user and by the generated digital persona, a further synthetic media file of the plurality of synthetic media files to continue or modify a conversation between the generated digital persona and the user.

3. The human centered computing based digital persona generation apparatus according to claim 1, further comprising:
a conversation adapter, executed by the at least one hardware processor, to
utilize, based on a level selected from a plurality of levels associated with the real-time emotion of the user and by the generated digital persona, a further synthetic media file of the plurality of synthetic media files to continue or modify a conversation between the generated digital persona and the user.

4. The human centered computing based digital persona generation apparatus according to claim 1, further comprising:
a conversation adapter, executed by the at least one hardware processor, to
utilize, based on the real-time emotion of the user, a topic of interest specified by the user, and by the generated digital persona, a further synthetic media file of the plurality of synthetic media files to continue or modify a conversation between the generated digital persona and the user.

5. The human centered computing based digital persona generation apparatus according to claim 1, further comprising:
a conversation adapter, executed by the at least one hardware processor, to
compare an involvement level of the user to a specified threshold;
based on a determination that the involvement level meets or exceeds the specified threshold, continue a conversation between the generated digital persona and the user; and
based on a determination that the involvement level is less than the specified threshold, modify the conversation between the generated digital persona and the user.

6. The human centered computing based digital persona generation apparatus according to claim 1, wherein the dialogue and navigation manager is executed by the at least one hardware processor to receive, from the user of the generated digital persona, the inquiry by:
receiving, within a specified time interval associated with monitoring for inquiries, the inquiry from the user.

7. The human centered computing based digital persona generation apparatus according to claim 1, wherein the dialogue and navigation manager is executed by the at least one hardware processor to:
determine whether a specified time interval associated with monitoring for inquiries is exceeded; and
based on a determination that the specified time interval associated with monitoring for inquiries is exceeded, utilize, by the generated digital persona, a further synthetic media file of the plurality of synthetic media files to prompt the user.

8. The human centered computing based digital persona generation apparatus according to claim 1, wherein the dialogue and navigation manager is executed by the at least one hardware processor to:
end, based on a keyword in the inquiry, a conversation between the generated digital persona and the user.

9. The human centered computing based digital persona generation apparatus according to claim 1, wherein the dialogue and navigation manager is executed by the at least one hardware processor to:
determine, based on training associated with a plurality of user utterances, which synthetic media file of the plurality of synthetic media files to utilize to respond to the inquiry.

10. The human centered computing based digital persona generation apparatus according to claim 1, wherein the speech synthesizer is executed by the at least one hardware processor to generate, for the digital persona that is to be generated for the target person, the plurality of synthetic audio files by:
generating, based on a plurality of audio file samples of different time intervals, for the digital persona that is to be generated for the target person, the plurality of synthetic audio files.

11. A method for human centered computing based digital persona generation, the method comprising:
generating, by at least one hardware processor, for a digital persona that is to be generated for a target person, a plurality of synthetic video files;
generating, by the at least one hardware processor, for the digital persona that is to be generated for the target person, a plurality of synthetic audio files;
generating, by the at least one hardware processor, a plurality of synthetic media files by combining the synthetic video files and the synthetic audio files;
generating, by the at least one hardware processor, based on a synthetic media file of the plurality of synthetic media files, the digital persona displayed as a holographic projection of the target person;
receiving, by the at least one hardware processor, from a user of the generated digital persona, an inquiry; and
analyzing, by the at least one hardware processor, a real-time emotion of the user by analyzing at least one of a text sentiment associated with the inquiry, a voice sentiment associated with the user, or a facial expression associated with the user.

12. The method for human centered computing based digital persona generation according to claim 11, the method comprising:
utilizing, by the at least one hardware processor, based on an analysis of the inquiry and by the generated digital persona, another synthetic media file of the plurality of synthetic media files to respond to the inquiry.

13. The method for human centered computing based digital persona generation according to claim 11, the method comprising:
utilizing, by the at least one hardware processor, based on the real-time emotion of the user and by the generated digital persona, a further synthetic media file of the plurality of synthetic media files to continue or modify a conversation between the generated digital persona and the user.

14. A non-transitory computer readable medium having stored thereon machine readable instructions, the machine readable instructions, when executed by at least one hardware processor, cause the at least one hardware processor to:
generate, for a digital persona that is to be generated for a target person, a plurality of synthetic video files;
generate, for the digital persona that is to be generated for the target person, a plurality of synthetic audio files;
generate a plurality of synthetic media files by combining the synthetic video files and the synthetic audio files;
generate, based on a synthetic media file of the plurality of synthetic media files, the digital persona displayed as a holographic projection of the target person;
receive, from a user of the generated digital persona, an inquiry;
utilize, based on an analysis of the inquiry and by the generated digital persona, another synthetic media file of the plurality of synthetic media files to respond to the inquiry;
analyze a real-time emotion of the user by analyzing at least one of a text sentiment associated with the inquiry, a voice sentiment associated with the user, or a facial expression associated with the user; and
utilize, based on the real-time emotion of the user and by the generated digital persona, a further synthetic media file of the plurality of synthetic media files to continue or modify a conversation between the generated digital persona and the user.

15. The non-transitory computer readable medium according to claim 14, wherein the machine readable instructions, when executed by the at least one hardware processor, further cause the at least one hardware processor to:
determine whether a specified time interval associated with monitoring for inquiries is exceeded; and
based on a determination that the specified time interval associated with monitoring for inquiries is exceeded, utilize, by the generated digital persona, a yet further synthetic media file of the plurality of synthetic media files to prompt the user.

16. The non-transitory computer readable medium according to claim 14, wherein the machine readable instructions, when executed by the at least one hardware processor, further cause the at least one hardware processor to:
end, based on a keyword in the inquiry, the conversation between the generated digital persona and the user.

17. The non-transitory computer readable medium according to claim 14, wherein the machine readable instructions to utilize, based on the real-time emotion of the user and by the generated digital persona, the further synthetic media file of the plurality of synthetic media files to continue or modify the conversation between the generated digital persona and the user, when executed by the at least one hardware processor, further cause the at least one hardware processor to:
compare an involvement level of the user to a specified threshold;
based on a determination that the involvement level meets or exceeds the specified threshold, continue the conversation between the generated digital persona and the user; and
based on a determination that the involvement level is less than the specified threshold, modify the conversation between the generated digital persona and the user.

* * * * *